US012756434B2

(12) United States Patent
Athley et al.

(10) Patent No.: US 12,756,434 B2
(45) Date of Patent: Oct. 6, 2026

(54) REFERENCE SIGNAL PORT MAPPING

(71) Applicant: Telefonaktiebolaget LM Ericsson (publ), Stockholm (SE)

(72) Inventors: Fredrik Athley, Västra Frölunda (SE); Xinlin Zhang, Gothenburg (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 18/270,058

(22) PCT Filed: Dec. 16, 2021

(86) PCT No.: PCT/EP2021/086347
§ 371 (c)(1),
(2) Date: Jun. 28, 2023

(87) PCT Pub. No.: WO2022/144190
PCT Pub. Date: Jul. 7, 2022

(65) Prior Publication Data
US 2024/0088954 A1 Mar. 14, 2024

Related U.S. Application Data

(60) Provisional application No. 63/131,897, filed on Dec. 30, 2020.

(51) Int. Cl.

| | |
|---|---|
| ***H04W 4/00*** | (2018.01) |
| ***H04B 7/0456*** | (2017.01) |
| ***H04B 7/06*** | (2006.01) |

(52) U.S. Cl.
CPC ......... *H04B 7/0456* (2013.01); *H04B 7/0481* (2023.05); *H04B 7/0617* (2013.01); *H04B 7/0626* (2013.01); *H04B 7/0639* (2013.01)

(58) Field of Classification Search
None
See application file for complete search history.

(56) References Cited

U.S. PATENT DOCUMENTS

2015/0195071 A1* 7/2015 Lunttila ............ H04L 25/03904 370/329
2017/0264405 A1 9/2017 Gao et al.
(Continued)

FOREIGN PATENT DOCUMENTS

JP 2018-533865 A 11/2018

OTHER PUBLICATIONS

International Search Report and Written Opinion issued in International Application No. PCT/EP2021/086347 dated Dec. 16, 2021 (19 pages).
(Continued)

*Primary Examiner* — Zewdu A Beyen
(74) *Attorney, Agent, or Firm* — Rothwell, Figg, Ernst & Manbeck, P.C.

(57) ABSTRACT

A method for reducing the number of beams required per symbol. The method is performed by a base station (gNB). The method includes transmitting reference signals (RSs) and receiving a report from a UE (302), the report identifying a matrix. The method also includes using the identified matrix to transmit data to the UE or schedule the UE. The matrix identified by the UE is equal to (I) and Wps is a port selection matrix and (II) denotes the Kronecker product.

8 Claims, 14 Drawing Sheets

(56) References Cited

U.S. PATENT DOCUMENTS

| | | | | |
|---|---|---|---|---|
| 2018/0309490 | A1 | 10/2018 | Rahman et al. | |
| 2021/0067291 | A1* | 3/2021 | Gao | H04L 5/0048 |

OTHER PUBLICATIONS

Zte et al., "On CSI-RS for CSI acquisition and beam management," 3GPP TSG RAN WG1 Meeting 91, R1-1719541, Reno, USA, Nov. 27-Dec. 1, Oct. 2017 (8 pages).
Intel Corporation, "Remaining details on CSI-RS," 3GPP TSG RAN WG1 Meeting #90bis, R1-1717372, Prague, CZ, Oct. 9-13, 2017 (9 pages).
Määttänen, H., et al., "System-level performance of LTE-Advanced with joint transmission and dynamic point selection schemes," EURASIP Journal on Advances in Signal Processing 2012:247 (18 pages).
Pantech, "Aggregated PMI feedback to support DL CoMP," 3GPP TSG RAN1 #69, R1-122446, Prague, Czech Republic, May 21-May 25, 2012 (3 pages).
ETSI TS 138 214 V16.3.0 (Nov. 2020) (3GPP TS 38.214 version 16.3.0 Release 16), Nov. 2020 (169 pages).
ETSI TS 138 211 V16.3.0 (Nov. 2020) (3GPP TS 38.211 version 16.3.0 Release 16), Nov. 2020 (136 pages).

* cited by examiner

| | CDM group | Port nr. | Polarization | Direction | Symbol |
|---|---|---|---|---|---|
| | 0 | 0-1 | / | $\phi_1, \phi_2$ | $l_0$ |
| | 1 | 2-3 | \ | $\phi_1, \phi_2$ | $l_0 + 1$ |

Mapping after proposed change

| CDM group | Port nr. | Polarization | Direction | Symbol |
|---|---|---|---|---|
| 0 | 0, 2 | /, \ | $\phi_1$ | $l_0$ |
| 1 | 1, 3 | /, \ | $\phi_2$ | $l_0 + 1$ |

Mapping after proposed change

| | CDM group | Port nr. | Polarization | Direction | Symbol |
|---|---|---|---|---|---|
| | 0 | 0, 4 | /, \ | $\phi_1$ | $l_0$ |
| | 1 | 1, 5 | /, \ | $\phi_2$ | $l_0$ |
| | 2 | 2, 6 | /, \ | $\phi_3$ | $l_0 + 1$ |
| | 3 | 3, 7 | /, \ | $\phi_4$ | $l_0 + 1$ |

Mapping after proposed change

| CDM group | Port nr. | Polarization | Direction | Symbol |
|---|---|---|---|---|
| 0 | 0-1 | / | $\phi_1, \phi_2$ | $l_0$ |
| 1 | 2-3 | / | $\phi_3, \phi_4$ | $l_0 + 1$ |
| 2 | 4-5 | \ | $\phi_1, \phi_2$ | $l_0$ |
| 3 | 6-7 | \ | $\phi_3, \phi_4$ | $l_0 + 1$ |

| | CDM group | Port nr. | Polarization | Direction | Symbol |
|---|---|---|---|---|---|
| | 0 | 0, 4 | /, \ | $\phi_1$ | $l_0$ |
| | 1 | 1, 5 | /, \ | $\phi_2$ | $l_0 + 1$ |
| | 2 | 2, 6 | /, \ | $\phi_3$ | $l_0 + 2$ |
| | 3 | 3, 7 | /, \ | $\phi_4$ | $l_0 + 3$ |

REFERENCE SIGNAL PORT MAPPING

CROSS REFERENCE TO RELATED APPLICATIONS

This application is a 35 U.S.C. § 371 National Stage of International Patent Application No. PCT/EP2021/086347, filed 2021 Dec. 16, which claims priority to U.S. provisional patent application No. 63/131,897, filed on 2020 Dec. 30, which is incorporated by this reference.

TECHNICAL FIELD

This disclosure relates to reference signal port mapping.

BACKGROUND

1. Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The 3rd Generation Partnership Project (3GPP) New Radio (NR) standard is currently evolving with enhanced MIMO support. A core component in NR is the support of MIMO antenna deployments and MIMO related techniques like for instance spatial multiplexing. The spatial multiplexing mode is aimed for high data rates in favorable channel conditions. An illustration of the spatial multiplexing operation is provided in FIG. 1A.

As seen in FIG. 1A, the information carrying symbol vector s is multiplied by an $N_T \times r$ matrix W (which is referred to below as the "precoder matrix"), which serves to distribute the transmit energy in a subspace of the $N_T$ dimensional vector space (corresponding to $N_T$ antenna ports). The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (and DFT precoded OFDM in the uplink for rank-1 transmission) and hence the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder matrix W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE.

In closed-loop precoding for the NR downlink, the UE transmits, based on channel measurements in the downlink, recommendations to the NR base station (denoted "gNB") of a suitable precoder matrix to use. The gNB configures the UE to provide feedback according to CSI-ReportConfig and may transmit CSI-RS and configure the UE to use measurements of CSI-RS to feed back recommended precoding matrices that the UE selects from a codebook. A single precoder matrix that is supposed to cover a large bandwidth (wideband precoding) may be fed back. It may also be beneficial to match the frequency variations of the channel and instead feed back a frequency-selective precoding report, e.g. several precoder matrices, one per subband. This is an example of the more general case of channel state information (CSI) feedback, which also encompasses feeding back other information than recommended precoder matrices to assist the gNodeB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBS depending on the band width part (BWP) size.

Given the CSI feedback from the UE, the gNB determines the transmission parameters it wishes to use to transmit data to the UE, including the precoding matrix, transmission rank, and modulation and coding scheme (MCS). These transmission parameters may differ from the recommendations the UE makes. The transmission rank, and thus the number of spatially multiplexed layers, is reflected in the number of columns of the precoder matrix W. For efficient performance, it is important that a transmission rank that matches the channel properties is selected.

2. 2D Antenna Arrays

A two-dimensional antenna array may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h \times N_v \times N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. An example of a 4×4 array with dual-polarized antenna elements is illustrated in FIG. 1B.

Precoding a signal may be interpreted as multiplying the signal with different precoding (a.k.a., "beamforming") weights for each antenna prior to transmission. A typical approach is to tailor the precoder matrix to the antenna form factor, i.e. taking into account $N_h$, $N_v$, and $N_p$ when designing the precoder matrix codebook.

The codebooks have been designed with a specific antenna numbering in mind (or rather port numbering scheme, where the mapping of antenna port to physical antenna is up to each deployment). For a given P antenna ports, the precoding codebooks are designed so that the P/2 first antenna ports should map to a set of co-polarized antennas and the P/2 last antenna ports are mapped to another set of co-polarized antennas, with an orthogonal polarization to the first set. This is thus targeting dual-polarized antenna arrays. FIG. 1C illustrates an example with eight antenna ports.

3. Channel State Information (CSI) Reference Signals (CSI-RS)

For CSI measurement and feedback, CSI reference signals (CSI-RS) are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in NR are {1,2,4,8,12,16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain resource elements (REs) in a slot and certain slots. FIG. 2 shows an example of CSI-RS REs for 12 antenna ports, where 1 RE per RB per port is shown.

In addition, interference measurement resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI (i.e., rank, precoding matrix, and the channel quality). Furthermore, a UE in NR may be configured to measure interference based on one or multiple NZP CSI-RS resources.

3.1 CSI-RS Port Mapping

There are 18 different CSI-RS resource configurations in NR, where each has a specific number of ports X, see Table 1 below which is a copy of table 7.4.1.5.3-1 from 3GPP Technical Specification (TS) 38.211 V16.3.0 ("TS 38.211"). When code division multiplexing (CDM) is applied, the index $k_i$ indicates the first subcarrier in the PRB that is used for mapping the CSI-RS sequence to resource elements, where the second subcarrier is $k_i+1$. This set $(k_i, k_i+1)$ of two subcarriers is associated with a CDM group j, where a CDM group covers 1, 2 or 4 OFDM symbols. The index $l_{i'}$, or $l_i+1$, indicates the first OFDM symbol within the slot that is associated with a CDM group. The parameters $k_i$ and $l_{i'}$, are signalled from gNB to UE by RRC signalling when configuring the CSI-RS resource.

When CDM is applied, the size of a CDM group (L) is either 2, 4 or 8 and the total number of CDM groups is given by the number of $(k_i, l_{i'})$, $(k_i, l_i+1)$ pairs given by the configuration. A CDM group can thus refer to a set of 2, 4 or 8 antenna ports, where the set of 2 antenna ports occurs when only CDM in frequency-domain (FD) over two adjacent subcarriers is considered (FD-CDM2).

According to section 7.4.1.5.3 of TS 38.211, CSI-RS ports are numbered within a CDM group first and then across CDM groups. The UE shall assume that a CSI-RS is transmitted using antenna ports p numbered according to:

$$p = 3000 + s + jL; \quad \text{(Eq. 1)}$$
$$j = 0, 1, \ldots, N/L - 1,$$
$$s = 0, 1, \ldots, L - 1;$$

where s is the sequence index, L ∈{1,2,4,8} is the CDM group size, and N is the number of CSI-RS ports. The CDM group index j given in Table 7.4.1.5.3-1 in 38.211corresponds to the time/frequency locations $(\bar{k}, \bar{l})$ for a given row of the table. This table is reproduced in Table 1 for convenience. For example, CSI-RS resource configuration given by row 4 in Table 1 has two CDM groups (j=0,1) of size L=2, where the ports 3000 and 3001 maps to the CDM group indicated by $k_0$ and the ports 3002 and 3003 maps to the CDM group indicated by $k_0+2$.

TABLE 1

| Row | Ports X | Density ρ | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0),$ | 0 | 0 | 0 |
| 3 | 2 | 1, 0.5 | fd-CDM2 | $(k_0, l_0),$ | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |

TABLE 1-continued

| Row | Ports X | Density ρ | cdm-Type | $(\bar{k}, \bar{l})$ | CDM group index j | k' | l' |
|---|---|---|---|---|---|---|---|
| 16 | 32 | 1, 0.5 | fd-CDM2 | $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0, l_1)$, $(k_1, l_1)$, $(k_2, l_1)$, $(k_3, l_1)$, $(k_0, l_1+1)$, $(k_1, l_1+1)$, $(k_2, l_1+1)$, $(k_3, l_1+1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0)$, $(k_1, l_0)$, $(k_2, l_0)$, $(k_3, l_0)$ | 0, 1, 2, 3 | 0, 1 | 0, 1, 2, 3 |

4. CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report. Each CSI reporting setting may contain at least the following information: a CSI-RS resource set for channel measurement; an IMR resource set for interference measurement; a CSI-RS resource set for interference measurement; time-domain behavior, i.e. periodic, semi-persistent, or aperiodic reporting; frequency granularity, i.e. wideband or subband; CSI parameters to be reported such as RI, PMI, CQI, and CSI-RS resource indicator (CRI) in case of multiple CSI-RS resources in a resource set; Codebook types, i.e. type I or II, and codebook subset restriction; measurement restriction; and subband size (one out of two possible subband sizes is indicated, the value range depends on the bandwidth of the BWP; one CQI/PMI (if configured for subband reporting) is fed back per subband.

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the UE to the gNB in a single Physical Uplink Shared Channel (PUSCH) transmission.

5. NR Release 16 (Rel-16) Enhanced Type II Port Selection Code Book

Enhanced Type II (eType II) port selection (PS) codebook was introduced in Rel-16, which is intended to be used for beamformed CSI-RS, where each CSI-RS port covers a small portion of the cell coverage area with high gain (comparing to non-beamformed CSI-RS). Although it is up to the gNB implementation, it is usually assumed that each CSI-RS port is transmitted in a 2D spatial beam which has a main lobe with an azimuth pointing angle and an elevation pointing angle. The actual precoder matrix used for CSI-RS is transparent to UE. Based on the measurement, UE selects the best CSI-RS ports and recommends to gNB to use for DL transmission. The eType II PS codebook can be used by UE to feedback the selected CSI-RS ports and the way to combine them.

5.1 Structure, Configuration and Reporting of eType II PS Codebook

For a given transmission layer l, with $l \in \{1, \ldots, v\}$ and v being the rank indicator (RI), the precoder matrix for all FD-units is given by a size $P_{CSI\text{-}RS} \times N_3$ matrix $W_l$, where P_CSI-RS is the number of CSI-RS ports; N_3=N_SB×R is the number of PMI subbands, where the value R={1,2} (the PMI subband size indicator) is RRC configured and N_SB is the number of CQI bands, which is also RRC configured; the RI value v is set according to the configured higher layer parameter typeII-RI-Restriction-r16. UE shall not report v>4.

The precoder matrix $W_l$ can be factorized as $$W_l = W_1 \tilde{W}_{2,l} W_{f,l}^H, \text{ and } W_l$$

is normalized such that $\|W_l\|_F = 1/\sqrt{v}$, for l=1, . . . , v. $W_1$ is a size $P_{CSI\text{-}RS} \times 2L$ port selection matrix that can written as:

$$W_1 = \begin{bmatrix} W_{PS} & 0 \\ 0 & W_{PS} \end{bmatrix}$$

where $W_{PS}$ is a size $$\frac{P_{CSI\text{-}RS}}{2} \times L$$

port selection matrix consisting zeros and ones. Selected ports are indicated by ones which are common for both polarizations.

L is the number of selected CSI-RS ports per polarization. Supported L values can be found in Table 2.

$W_1$ is common for all layers.

$W_{f,l}$ is a size $N_3 \times M_v$ frequency-domain (FD) compression matrix for layer l, where $$M_v = \left\lceil p_v \frac{N_3}{R} \right\rceil$$

is the number of selected FD precoding vectors, which depends on the rank indicator v and the RRC configured parameter $P_v$ (supported values of $P_v$ can be found in Table 2); $W_{f,l} = [f_{0,l}\ f_{1,l} \ldots f_{M_v,l}]$, where $$\{f_{k,l}\}_{k=0}^{M_v-1}$$

are $M_v$ size $N_3\times1$ FD precoding vectors that are selected from $N_3$ orthogonal DFT basis vectors $$\{y_t\}_{t=0}^{N_3-1}$$

with size $N_3\times1$; and $W_{f,l}$ is layer-specific.

$\tilde{W}_{2,l}$ is a size $2L\times M_v$ linear combination coefficient matrix that contains $2LM_v$ coefficients for linearly combining the selected $M_v$ FD precoding vectors for the selected 2L CSI-RS ports. For layer l, only a subset of $$K_l^{NZ} \le K_0$$

coefficients are non-zero and reported. The remaining $$2LM_v - K_l^{NZ}$$

non-reported coefficients are considered zero. The amplitude and phase of coefficients in $\tilde{W}_{2,l}$ shall be quantized for reporting. $\tilde{W}_{2,l}$ is layer-specific.

TABLE 2

Rel-16 eType II PS codebook parameter configurations for L, $p_v$ and β

| paramCombination-r16 | L | $p_v$: v ϵ {1, 2} | $p_v$: v ϵ {3, 4} | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

SUMMARY

Certain challenges presently exist. For instance, there is an implementation complexity problem to transmit in many different directions (e.g. many different beams if beamforming is used at the transmitter) at the same time (e.g., in the same OFDM symbol). Ideally, from complexity perspective, a single beam with two ports (one per polarization) is transmitted in a wideband manner. That is, the same precoder/beamformer is used across the whole transmission bandwidth, for both polarizations, in one OFDM symbol. It is a problem that the current structure of CSI-RS port to resource element and OFDM symbol mapping in NR cause high implementation complexity.

Accordingly, this disclosure provides alternative resource element mapping of CSI-RS ports so that ports corresponding to the same beam are mapped to the same OFDM symbol. In general, to reduce implementation complexity, this disclosure aims at minimizing the number of beams required per OFDM symbol. Typically, a beam contains two CSI-RS ports, one per polarization, transmitted in the same beam direction, as dual polarized antennas and beams are commonly used in NR. This mapping will reduce the number of different beamforming vectors (i.e., number of beam directions) that need to be applied and transmitted per OFDM symbol. It also enables the ideal case of a single wideband beamforming vector.

In one aspect there is provided a method for reducing the number of beams required per symbol. The method is performed by a base station (gNB). The method includes transmitting reference signals (RSs) and receiving a report from a UE (302), the report identifying a matrix. The method also includes using the identified matrix to transmit data to the UE or schedule the UE. The matrix identified by the UE is equal to $$W_{PS} \otimes \begin{bmatrix} 1 & 0 \\ 0 & 1 \end{bmatrix},$$

and Wps is a port selection matrix and ⊗ denotes the Kronecker product.

In another embodiment the method performed by the base station comprises transmitting a CSI-RS using a configuration that maps CSI-RS ports such that CSI-RS ports corresponding to the same beam with different polarizations are mapped to resource elements in the same symbol.

In another aspect there is provided a method that includes, for a UE, selecting a set of N transmission points, TPs, where N≥2. The method also includes, for each TP included in the set of TPs, employing the TP to transmit a CSI-RS according to a CSI-RS resource configuration for the TP. The method also includes receiving a CSI report transmitted by the UE, wherein the CSI report was determined by the UE based on an aggregation of the CSI-RS resource configurations.

In another aspect there is provided a computer program comprising instructions which when executed by processing circuitry of a base station, causes the base station to perform the base station methods disclosed herein. In another aspect there is provided a carrier containing the computer program, wherein the carrier is one of an electronic signal, an optical signal, a radio signal, and a computer readable storage medium.

In another aspect there is provided a base station where the base station is adapted to perform the method of any base station embodiments disclosed herein. In some embodiments, the base station includes processing circuitry; and a memory containing instructions executable by the processing circuitry, whereby the base station is operative to perform the base station methods disclosed herein.

In one aspect there is provided a method performed by a UE. The method includes receiving a reference signal and transmitting a report to a base station. The report identifies a matrix. The identified matrix is equal to $$W_{PS} \otimes \begin{bmatrix} 1 & 0 \\ 0 & 1 \end{bmatrix},$$

and Wps is a port selection matrix and ⊗ denotes the Kronecker product. In another embodiment a method performed by a UE includes estimating a downlink, DL, channel using a configuration that maps CSI-RS ports such that CSI-RS ports corresponding to the same beam with different polarizations are mapped to resource elements in the same symbol. In another aspect a method performed by a UE includes, for each transmission point, TP, included in a selected set of N TPs, where N≥2, obtaining a CSI-RS resource configuration for the TP, thereby obtaining N CSI-RS resource configurations. The method also includes receiving a CSI-RS from each one of the N TPs. The method also includes generating a CSI report based on an aggregation of the N CSI-RS resource configurations. The method also includes transmitting the CSI report to a base station.

In another aspect there is provided a computer program comprising instructions which when executed by processing circuitry of a UE, causes the UE to perform the UE methods disclosed herein. In another aspect there is provided a carrier containing the computer program, wherein the carrier is one of an electronic signal, an optical signal, a radio signal, and a computer readable storage medium.

In another aspect there is provided a UE where the UE is adapted to perform the method of any UE embodiments disclosed herein. In some embodiments, the UE includes processing circuitry; and a memory containing instructions executable by the processing circuitry, whereby the UE is operative to perform the UE methods disclosed herein.

An advantage of the embodiments is that is enables a simplified implementation of beamformed CSI-RS since fewer different beamforming vectors need to be applied per symbol. By reducing the number of different beamforming vectors per symbol, the freed up processing resources can instead be used for, for example, improved precoding of PDDCH and/or PDSCH in order to increase performance.

BRIEF DESCRIPTION OF THE DRAWINGS

The accompanying drawings, which are incorporated herein and form part of the specification, illustrate various embodiments.

DETAILED DESCRIPTION

In frequency division duplexing (FDD) operation, the uplink (UL) and downlink (DL) transmissions are carried out on different frequencies, thus the propagation channels in UL and DL are not reciprocal as in the time division duplexing (TDD) case. Despite this, some physical channel parameters (e.g., delays and angles to different clusters, which depend on the spatial properties of the channel but not the carrier frequency) are reciprocal between UL and DL. Such properties can be exploited to obtain partial reciprocity-based FDD transmission. The reciprocal part of the channel can be combined with the non-reciprocal part in order to obtain the complete channel. An estimate of the non-reciprocal part can be obtained by feedback from a user equipment (UE).

Figure 1A:
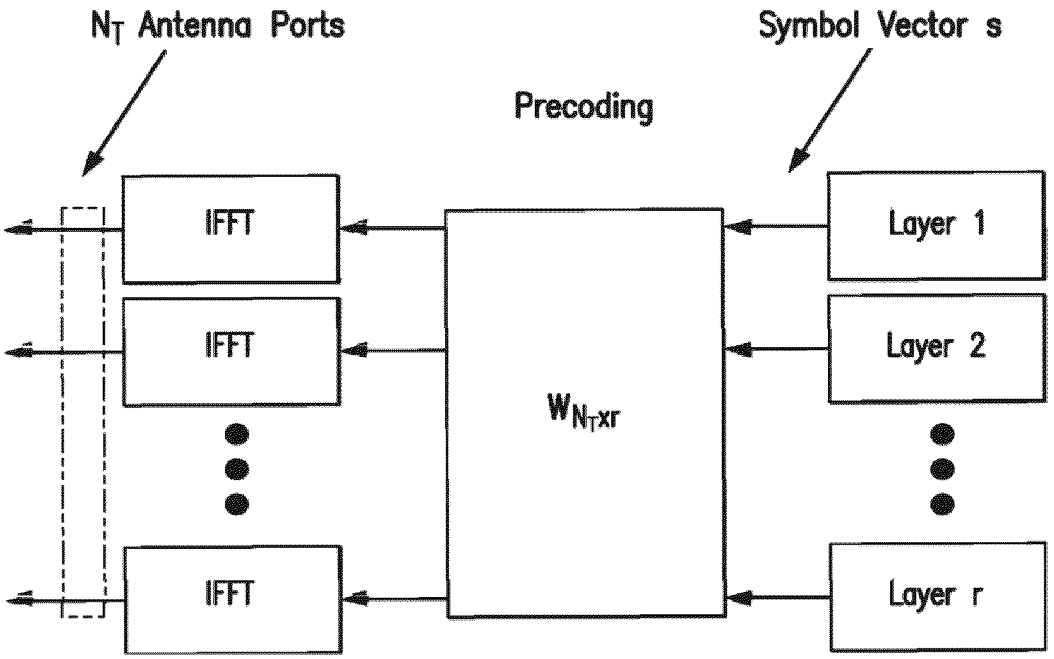
FIG. 1A illustrates spatial multiplexing.
Figure 1B:
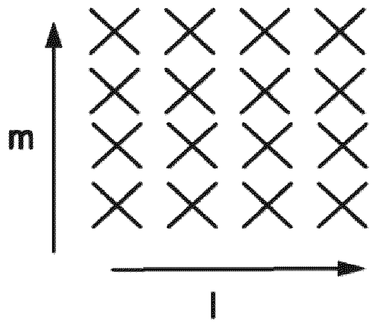
FIG. 1B illustrates an antenna array with dual-polarized antenna elements.
Figure 1C:
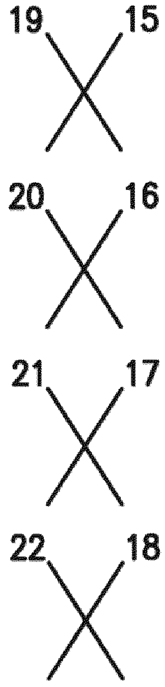
FIG. 1C illustrates an example of port numbering of eight antenna ports.
Figure 2:
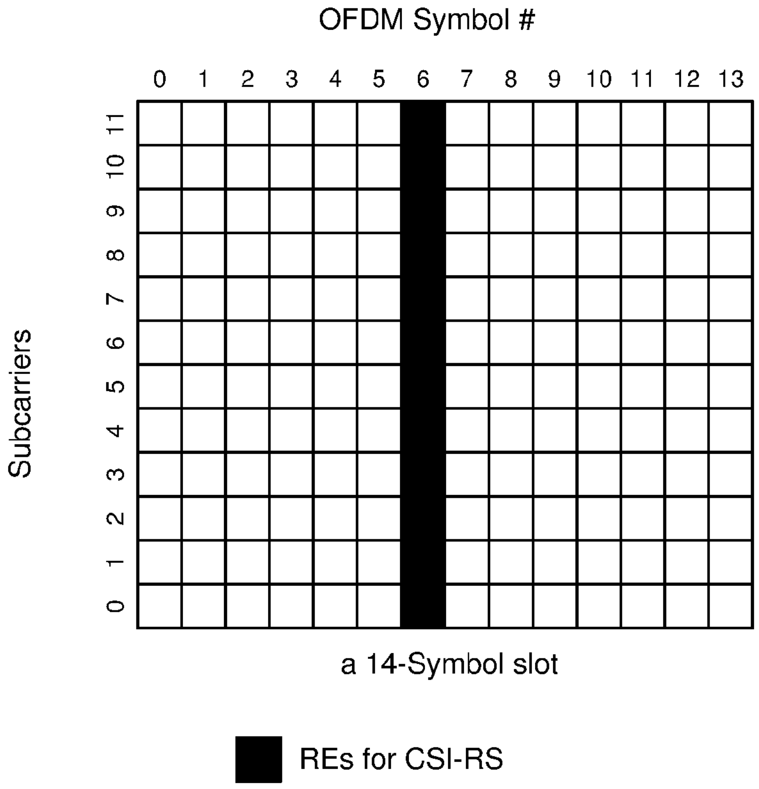
FIG. 2 illustrates CSI-RS resource elements.
Figure 3:
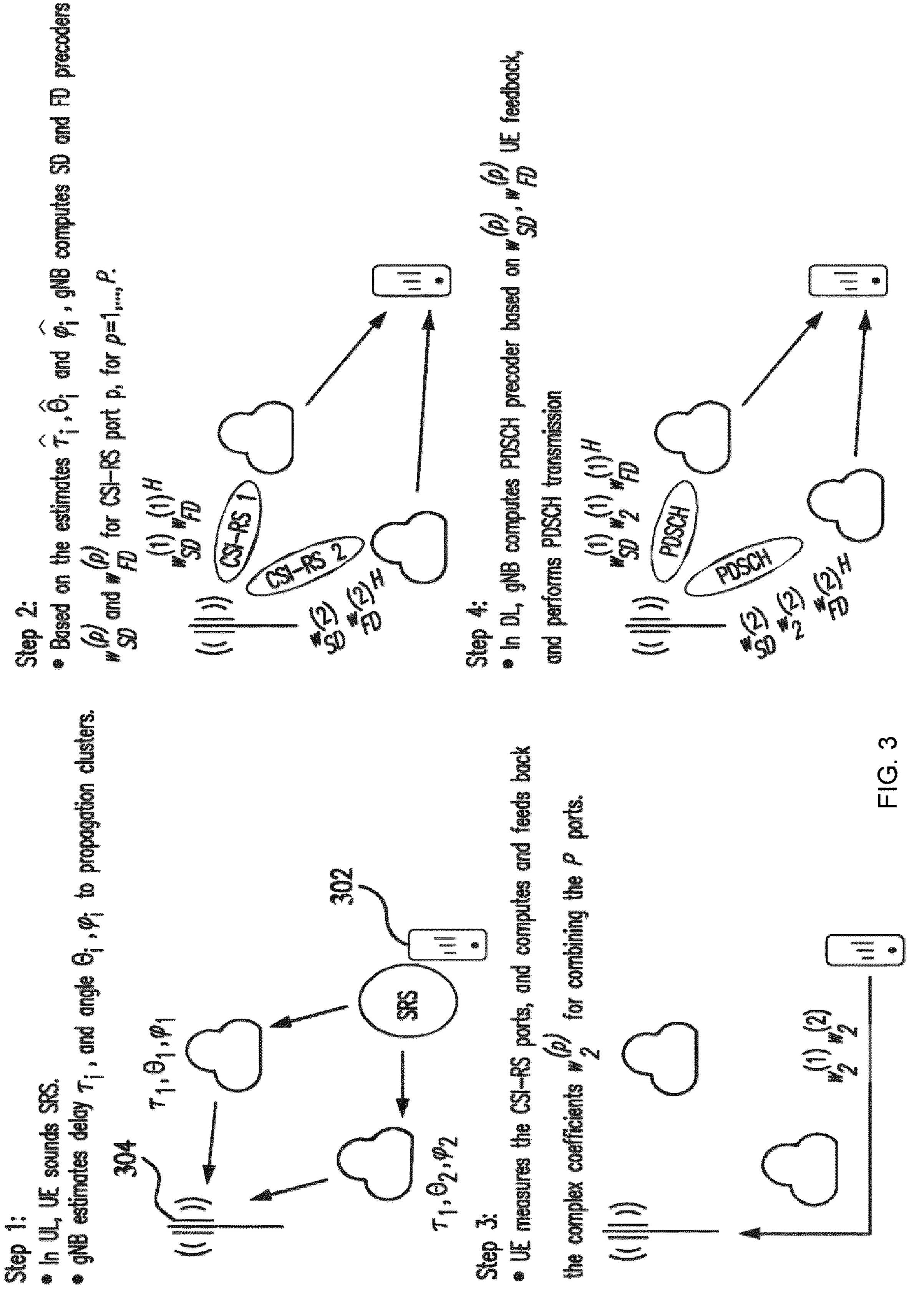
FIG. 3 illustrates an example procedure for reciprocity based FDD transmission.

One procedure for reciprocity based FDD transmission scheme is illustrated in FIG. 3 in 4 steps, assuming that NR Rel-16 enhanced Type II port-selection codebook is used.

In Step 1, a UE 302 is configured with SRS by a gNB 404 and the UE transmits a sounding reference signal (SRS) in the UL for the gNB to estimate the angles and delays of different clusters, which are associated with different propagation paths.

In Step 2, the gNB selects dominant clusters according to the estimated angle-delay power spectrum profile, and, for each of the selected cluster, the gNB precodes (e.g., beamforms) and transmits to the UE one CSI-RS port per polarization according to the obtained angle and/or delay estimation.

In Step 3, the gNB has configured the UE to measure a CSI-RS, and the UE measures the received CSI-RS ports and then determines a type II CSI including RI, PMI for each layer and CQI. The precoding matrix indicated by the PMI includes the selected beams (i.e., the precoded CSI-RS ports) and the corresponding best phase and amplitude for co-phasing the selected beams. The phase and amplitude for each beam are quantized and fed back to the gNB.

In Step 4, the gNB computes the DL precoding matrix per layer based on the selected beams and the corresponding amplitude and phase feedback and performs a Physical Downlink Shared Channel (PDSCH) transmission. The transmission is based on the feed-back (PMI) precoding matrices directly (e.g., SU-MIMO transmission) or the transmission precoding matrix is obtained from an algorithm combining CSI feedback from multiple UEs (MU-MIMO transmission). In this case, a precoder derived based on the precoding matrices (including the CSI reports from co-scheduled UEs) (e.g., Zero-Forcing precoder or regularized ZF precoder). The final precoder is commonly scaled so that the transmit power per power amplifier is not overridden.

Such reciprocity based transmission can potentially be utilized in a codebook-based DL transmission for FDD in order to, for example, reduce the feedback overhead in UL when NR Type II port-selection codebook is used. Another potential benefit is reduced complexity in the CSI calculation in the UE. Another potential benefit is reduced complexity in the CSI calculation in the UE.

As noted in the above section, there is an implementation complexity problem to transmit in many different directions (e.g. many different beams if beamforming is used at the transmitter) at the same time (e.g., in the same OFDM symbol). Ideally, from complexity perspective, a single beam with two ports (one per polarization) is transmitted in a wideband manner. That is, the same precoder/beamformer is used across the whole transmission bandwidth, for both polarizations, in one OFDM symbol. It is a problem that the current structure of CSI-RS port to resource element and OFDM symbol mapping in NR cause high implementation complexity.

In more detail, from the structure of $W_1$ in the NR precoding codebook, it can be deduced that two CSI-RS ports associated with two different polarizations of the same beam have port numbers n and $$n + \frac{P_{CSI-RS}}{2},$$

respectively. This fact together with the port numbering definition in (1) and the CSI-RS locations in Table 1 implies that it is not possible to map two CSI-RS ports associated with different polarizations to the same OFDM symbol. Instead, CSI-RS ports in the same symbol are associated with beams pointing in different directions in current NR standard.

Figure 4:
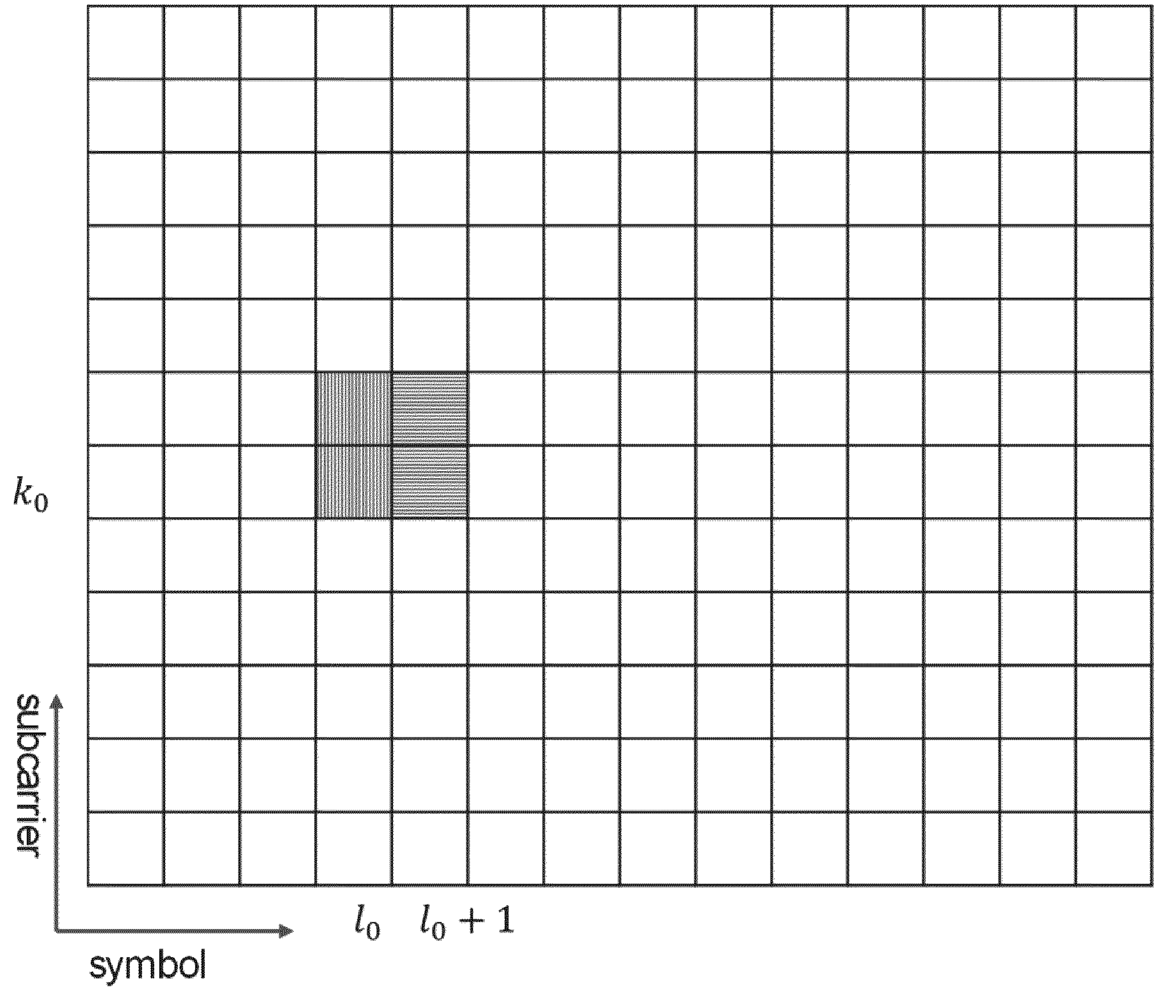
FIG. 4 (Prior Art)
FIG. 4 illustrates a prior art port mapping.

For example, in row 5 in Table 1 there are four ports divided into two CDM groups, where each CDM group spans two subcarriers and the different CDM groups are located in different symbols. According to the port numbering definition, Port 0-1 corresponds to the first polarization and port 2-3 corresponds to the second polarization. Port 0-1 belongs to CDM group 0 which is mapped to symbol $l_0+1$ and port 2-3 belongs to CDM group 1 which is mapped to the next OFDM symbol, symbol $l_0+1$. This is illustrated in FIG. 4 where it is assumed that CSI-RS ports 0 and 2 correspond to a beam pointing in a direction $\phi_1$ with a first polarization +45° (denoted by '/' in the figure) and a second polarization −45° (denoted by '\' in the figure), respectively. Furthermore, it is assumed that CSI-RS ports 1 and 3 correspond to a beam pointing in a direction $\phi_2$ with first polarization +45° and second polarization −45° , respectively.

This is consistent with the underlying assumption on the structure of $W_1$, i.e., that beams of a first polarization are associated with the first $$\frac{P_{CSI-RS}}{2}$$

ports (lowest port indices) and the same beams of a second polarization are associated with the last $$\frac{P_{CSI-RS}}{2}$$

ports (highest port indices). Hence, ports corresponding to different polarizations are mapped to different symbols while ports corresponding to the same polarization but different beam directions are mapped to the same symbol.

A typical transmission is to transmit port 0 and 2 in one beam direction and port 1 and 3 in another direction. This means that in one OFDM symbol, both beam directions are represented, leading to high implementation complexity.

Having different beam directions in the same symbol is a problem for the gNB hardware implementation since it is costly to have multiple beamformers in the same symbol. In the example above and as mentioned, two different beamforming vectors need to be applied within each resource block (when the density is 1). For other CSI-RS configurations with more than 4 ports (NR support up to 32 ports of a CSI-RS resource), this problem can be more pronounced. For example, for the configuration according to row 16 in Table 1 there are eight ports associated with eight different beam directions within one symbol.

In the enhanced Type II port-selection codebook for 3GPP release 17 (Rel-17) this problem may be exacerbated since the CSI-RS beamforming most likely will be UE-specific and use up to 32 ports. This means that, for each UE, CSI-RS ports will be beamformed to the dominant channel clusters for that UE. Thus, the total number of CSI-RS beamforming directions might be increased compared to previous releases.

Accordingly, this disclosure provides alternative resource element mapping of CSI-RS ports so that ports corresponding to the same beam are mapped to the same OFDM symbol. An objective is to reduce or minimize the number of different beams per OFDM symbol. This objective can be achieved in at least two different ways: (1) modification of the structure of $W_1$ in the Type II port selection codebook and (2) modification of the mapping of CSI-RS ports to time-frequency resources (e.g., resource elements (REs)).

1. Modification of the Codebook Structure

According to 3GPP TS 38.214 V16.3.0 ("TS 38.214"), $W_1$ is a size $P_{CSI-RS}\times 2L$ port selection matrix that can be factorized as:

$$W_1 = \begin{bmatrix} W_{PS} & 0 \\ 0 & W_{PS} \end{bmatrix} = \begin{bmatrix} 1 & 0 \\ 0 & 1 \end{bmatrix} \otimes W_{PS}.$$

$W_{PS}$ is a size $$\frac{P_{CSI-RS}}{2} \times L$$

port selection matrix consisting of zeros and ones, where $P_{CSI-RS}$ is the total number of beamformed CSI-RS ports, L is the number of selected CSI-RS ports per polarization, and ⊗ denotes the Kronecker product. In one embodiment where $P_{CSI-RS}=8$ (4 for each polarization) and L=2 and, therefore, 2 out for ports are selected, Wps may be given as:

$$W_{PS} = \begin{bmatrix} 1 & 0 \\ 0 & 1 \\ 0 & 0 \\ 0 & 0 \end{bmatrix}.$$

Selected ports are indicated by ones which are by assumption common for both polarizations. This structure of $W_1$ implies that if port n is selected, then also port $$n + \frac{P_{CSI-RS}}{2}$$

is selected. It also means that port n and port $$n + \frac{P_{CSI-RS}}{2}$$

correspond to the same beam with different polarizations.

It is observed that consecutive ports 2n and 2n+1 are generally mapped to the same OFDM symbol. The main idea is to ensure that consecutive ports 2n and 2n+1 correspond to different polarizations transmitted in the same beam.

In one embodiment, the structure of $W_1$ is changed according to:

$$W_1 = W_{PS} \otimes \begin{bmatrix} 1 & 0 \\ 0 & 1 \end{bmatrix}.$$

This means that if port 2n is selected for a beam (a column of $W_1$), then port 2n+1 is also selected. It is still assumed that the port selection is common for both polarization.

Hence, in this embodiment the port numbering is effectively changed so that ports corresponding to the same beam with different polarizations have contiguous port numbers, i.e., 2n and 2n+1. These ports will therefore belong to the same CDM group and thereby it is possible to map these ports to the same OFDM symbol, which reduces the number of beam directions in a symbol compared to legacy NR mapping.

2. Modification of CSI-RS Port Mapping

According to section 7.4.1.5.3 in TS 38.211, CSI-RS ports are numbered within a CDM group first and then across CDM groups. Furthermore, the CDM groups are numbered in order of increasing frequency domain allocation first and then increasing time domain allocation. Since the codebook structure is based on the assumption that port n and port $$n + \frac{P_{CSI-RS}}{2}$$

correspond to the same beam with different polarizations, two ports associated with different polarizations of the same beam are not mapped to the same symbol.

In the following, three embodiments are disclosed that enable mapping CSI-RS ports such that CSI-RS ports corresponding to the same beam with different polarizations are mapped to resource elements in the same symbol. With these embodiments the codebook structure and port numbering is maintained as in legacy NR, and instead the CSI-RS port mapping is modified.

2.1 Reordering of Port Numbering

In one embodiment, the CSI-RS port numbering order is modified so that ports are numbered across CDM groups first and then within a CDM group, while the numbering order within a CDM group follows the current NR standard. Table 3 shows an example of current and proposed port numbering for a case with eight ports divided into four CDM groups.

TABLE 3

Proposed reordering of port numbering in case of eight CSI-RS ports.

| CDM group | Current port numbering | Proposed port numbering |
|---|---|---|
| 0 | 0, 1 | 0, 4 |
| 1 | 2, 3 | 1, 5 |
| 2 | 4, 5 | 2, 6 |
| 3 | 6, 7 | 3, 7 |

Figure 5:
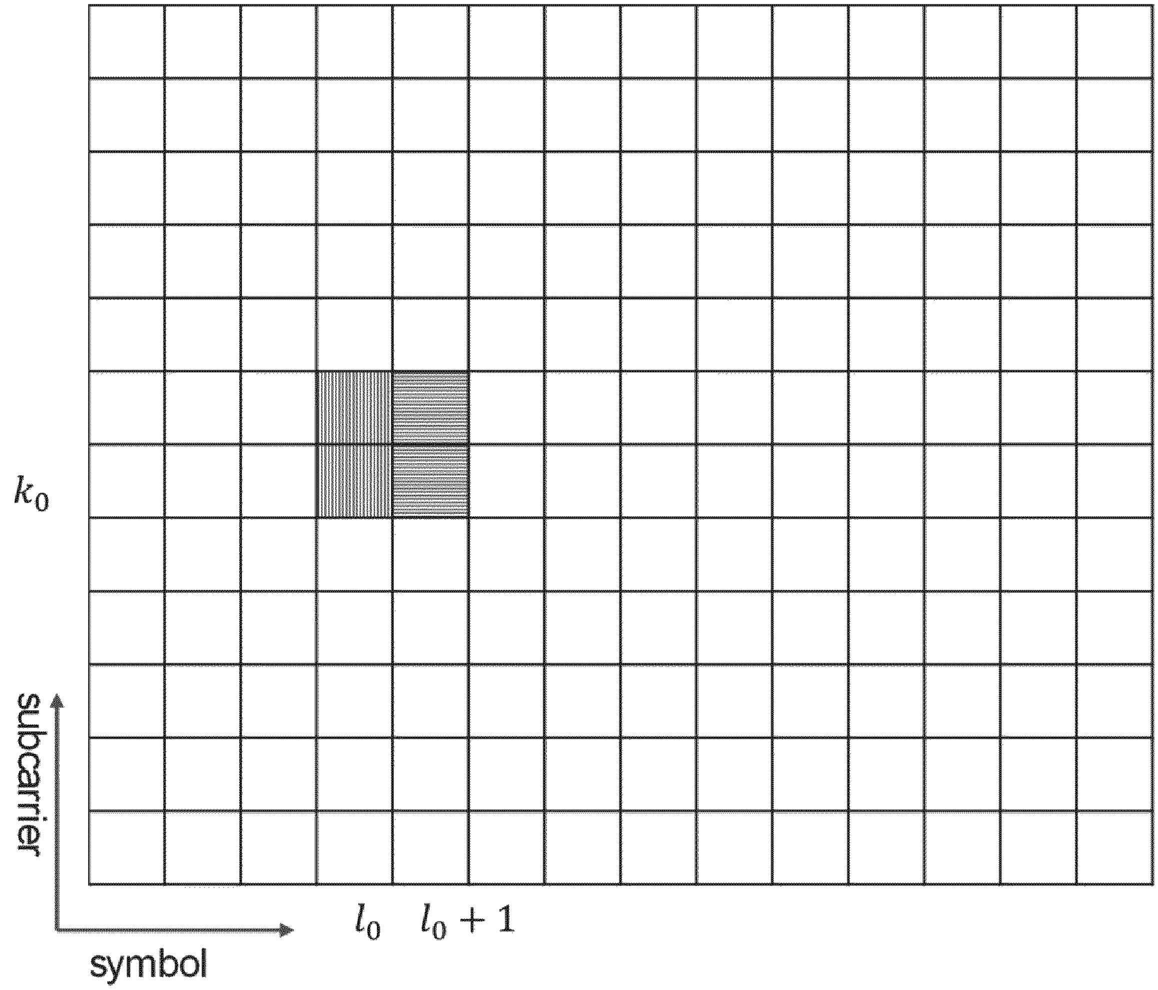
FIG. 5 illustrates a port mapping according to an embodiment.

FIG. 5 illustrates, using the same example as in FIG. 4, the proposed modification of the CSI-RS port mapping. As explained previously, the problem with the current mapping shown in FIG. 4 is that the two CSI-RS ports within a symbol are beamformed in different directions. This means that in every resource block (or every second resource block in case the density is 0.5), two different beamforming weight vectors need to be applied in two adjacent subcarriers. This is complex from a hardware implementation point of view.

According to this embodiment, port 0 and 2 are instead mapped to symbol $l_0$ and port 1 and 3 are mapped to symbol $l_0$+1. With this mapping, the same beamforming weight vector can be applied in all CSI-RS resource elements in a symbol. This will simplify implementation of the CSI-RS beamforming compared to legacy mapping.

Figure 6:
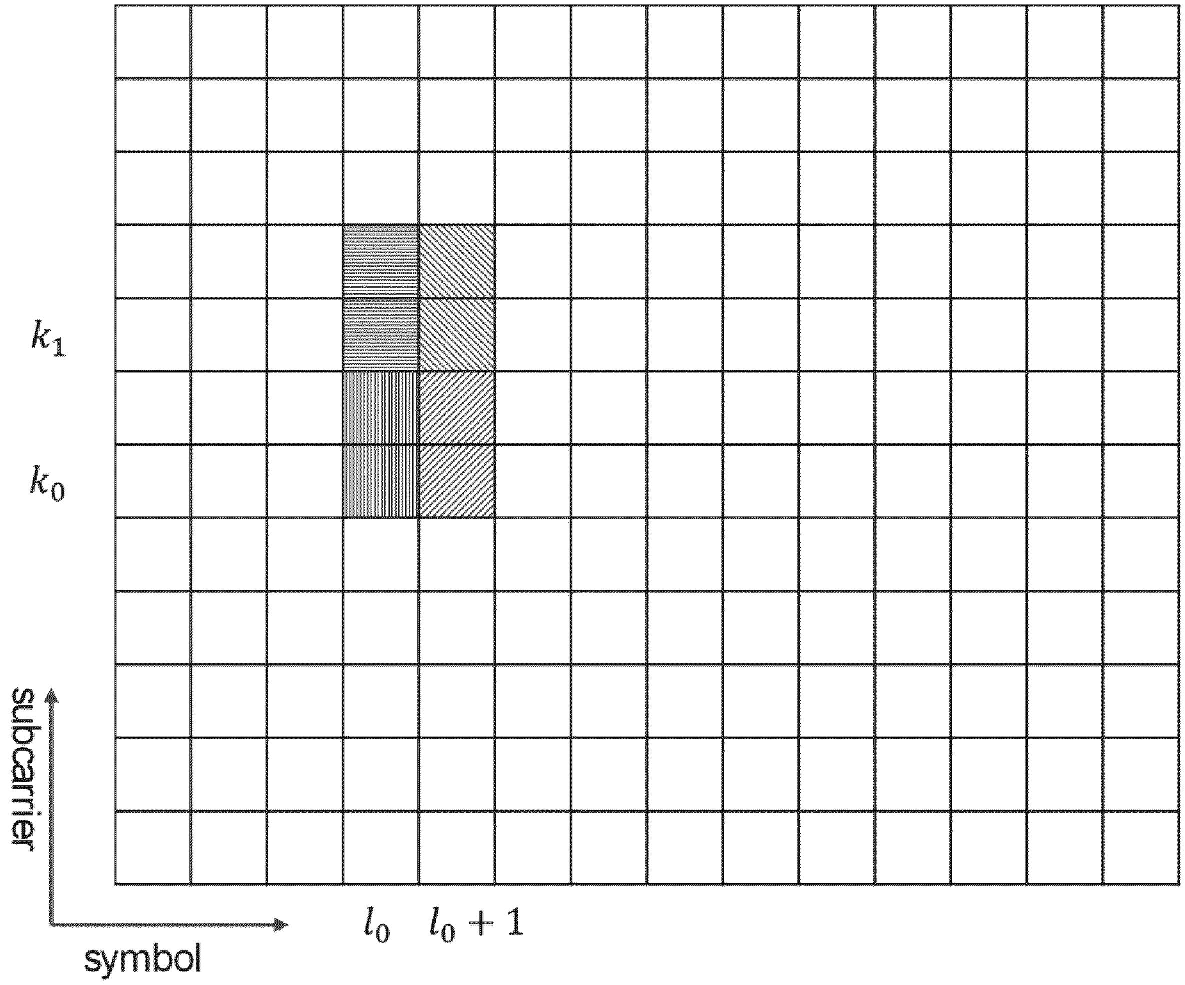
FIG. 6 illustrates a port mapping according to an embodiment.

An example with eight CSI-RS ports is shown in FIG. 6. FIG. 6 illustrates the port mapping for row 7 in Table 1 according to the current specifications and according to an embodiment. In this case there are four CDM groups spread over both frequency and time domain. With the mapping according to current specifications there will be four different beam directions in each symbol carrying CS-RS resource elements. With the mapping proposed in this embodiment, the number of beam directions is reduced by half to only two directions. Even though the CSI-RS beamformer cannot be wideband with the proposed mapping for this case, it is still a significant reduction in complexity compared to the current specifications.

2.2 Reordering of CDM Group Numbering

Figure 7:
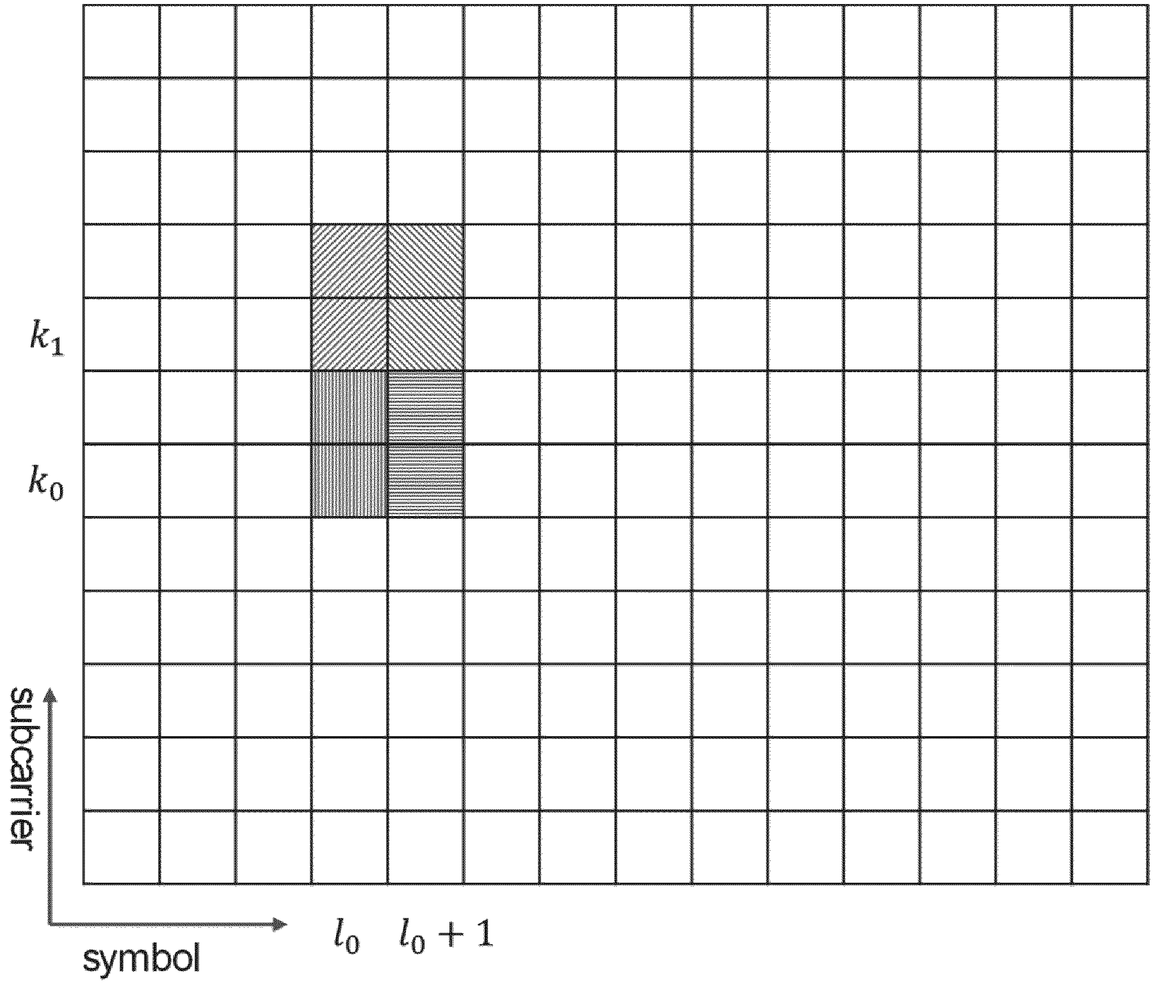
FIG. 7 illustrates a port mapping according to an embodiment.

In another embodiment, the ordering of CDM groups is modified instead of the port ordering. According to TS 38.211, the CDM groups are numbered in order of increasing frequency domain allocation first and then increasing time domain allocation. In this embodiment, the CDM groups are instead numbered in order of increasing time domain allocation first and then increasing frequency domain allocation. An example of this for row 7 in Table 1 is shown in FIG. 7. Also, in this case, the number of beamforming directions per symbol is reduced from four to two.

2.3 Introduction of New CSI-RS Resource Configurations

In one embodiment, Table 1 is extended with new CSI-RS resource configurations that give more possibilities to map CSI-RS ports having different beamforming directions to different symbols. Alternatively, an alternative table for CSI-RS resources is defined which has the desired properties.

The new CSI-RS resource configuration use CDM group which is across subcarriers only, not across time, hence l' in Table 1 only have the value l'=0. This ensures that one CSI-RS port is present in one OFDM symbol only, which reduces the implementation complexity.

For example, with eight CSI-RS ports there is currently no mapping that gives a single beamforming direction per symbol. This can be achieved by introducing a FD-cdm2 configuration over 4 OFDM symbols according to:

| Ports X | Density ρ | cdm-Type | $(\bar{k}, \bar{l})$ | CDM group index j | k' | l' |
|---|---|---|---|---|---|---|
| 8 | 1 | FD-cdm2 | $(k_0, l_0), (k_0, l_0 + 1), (k_0, l_0 + 2), (k_0, l_0 + 3)$ | 0, 1, 2, 3 | 0, 1 | 0 |

Figure 8:
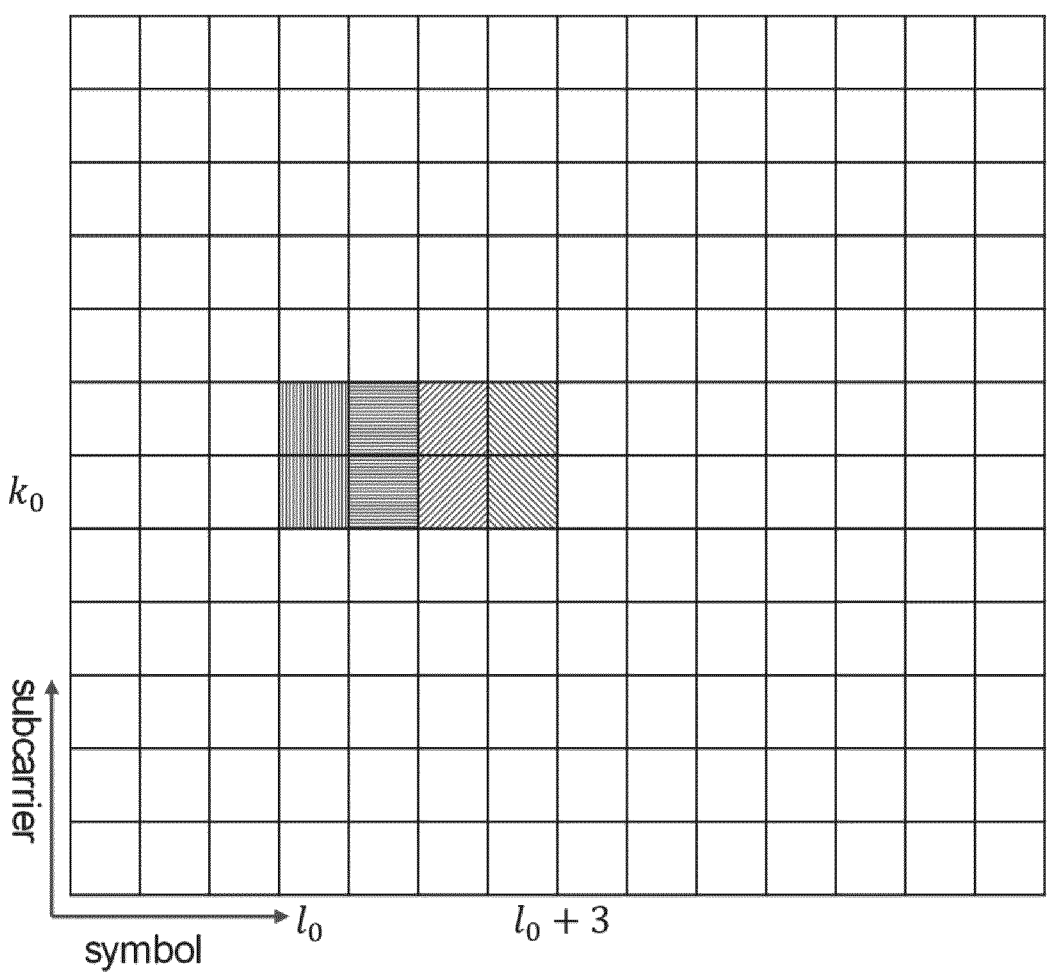
FIG. 8 illustrates a port mapping according to an embodiment.

This configuration combined with the port renumbering embodiment is illustrated in FIG. 8. It can be seen that in this case there is only one beamforming direction per symbol.

In another example, with 16 CSI-RS ports there is currently no mapping that gives at most two beamforming direction per symbol. This can be achieved by introducing a FD-cdm4 configuration over 4 OFDM symbols according to:

| Ports X | Density ρ | cdm-Type | $(\bar{k}, \bar{l})$ | CDM group index j | k' | l' |
|---|---|---|---|---|---|---|
| 16 | 1 | FD-cdm4 | $(k_0, l_0), (k_0, l_0 + 1), (k_0, l_0 + 2), (k_0, l_0 + 3)$ | 0, 1, 2, 3 | 0, 1, 2, 3 | 0 |

In this case there are only two beamforming directions per symbol.

2.4 Aggregating CSI-RS Resource Configurations

In yet another embodiment, a new CSI-RS resource configuration for a larger number of ports is obtained by aggregating multiple instances of legacy (e.g., Rel-15) CSI-RS resource configuration of fewer ports (mapped to different OFDM symbols) to achieve the desired number of ports in the new resource configuration. The fewer port resources have the desired properties of having only 2 or 4 ports per symbol to minimize the number of beams per symbol to 1 or 2. For example, K multiples of row 3 or 4 in Table 1 can be aggregated into a new 2K or 4K port CSI-RS resource respectively, using K OFDM symbols.

2.5 Coherent Joint Transmission (CJT)

In another embodiment, aggregation of CSI-RS resource configurations is used for coherent joint transmission (CJT) from multiple transmission points (TPs). In this case, a UE is configured with one (or multiple) CSI-RS resource configuration(s) for each transmission point participating in the CJT. The UE then calculates a Type II CSI report jointly for all transmission points by aggregating the CSI-RS resource configurations for all transmission points. The UE then feeds back the calculated CSI report to the base station and the base station can use the CSI report for, e.g, determining a precoder for coherent joint transmission from the transmission points.

For example, a gNB configures a UE with two CSI-RS resource configurations (e.g., CSI-RS resource settings), one for each TP (e.g., TP1 and TP2). That is, the gNB network provides to the UE (e.g., via RRC configuration) a CSI resource configuration that identifies a first CSI resource for TP1 and a second CSI resource for TP2. Based on a measurement of a CSI-RS transmitted using the first CSI-RS resource, the UE generates a first channel estimate (H1) for the channel between the UE and TP1, and based on a measurement of a CSI-RS transmitted using the second CSI-RS resource, the UE generates a second channel estimate (H2) for the channel between the UE and TP2.

The UE the aggregates the channel H=[H1; H2]. That is, the UE stacks the channel H1 and H2 along the CSI-RS port dimension. For example, consider a single antenna UE case: the channel to TP1, H1, is of dimension P1 by N, where P1 is the number of CSI-RS ports and N is the number of frequency subbands. The channel to TP2, H2, is of dimension P2 by N. Then, H=[H1; H2] is obtained by stacking H1 over H2, so that H is of dimension (P1+P2) by N.

Based on the aggregated channel H, the UE calculates a Type II PMI, denoted by W, whereas W can be decomposed as W=[W(1); W(2)], where W(1) is the PMI for TRP1 and W(2) is the PMI for TRP(2). The UE includes the calculated Type II PMI in a CSI report and sends the report to the gNB.

3. Configuration

The embodiments in this disclosure introduce alternative CSI-RS resource configurations or alternative definition of MIMO precoding codebook. For all these alternatives, it is assumed that the UE supports the embodiments described here and informs the network that it has this capability. If the UE support these new alternative solutions, the network can subsequently configure the UE to use the new configuration using e.g. RRC signaling. In one embodiment, before receiving such signaling from the network, the UE shall use the legacy descriptions.

Figure 9A:
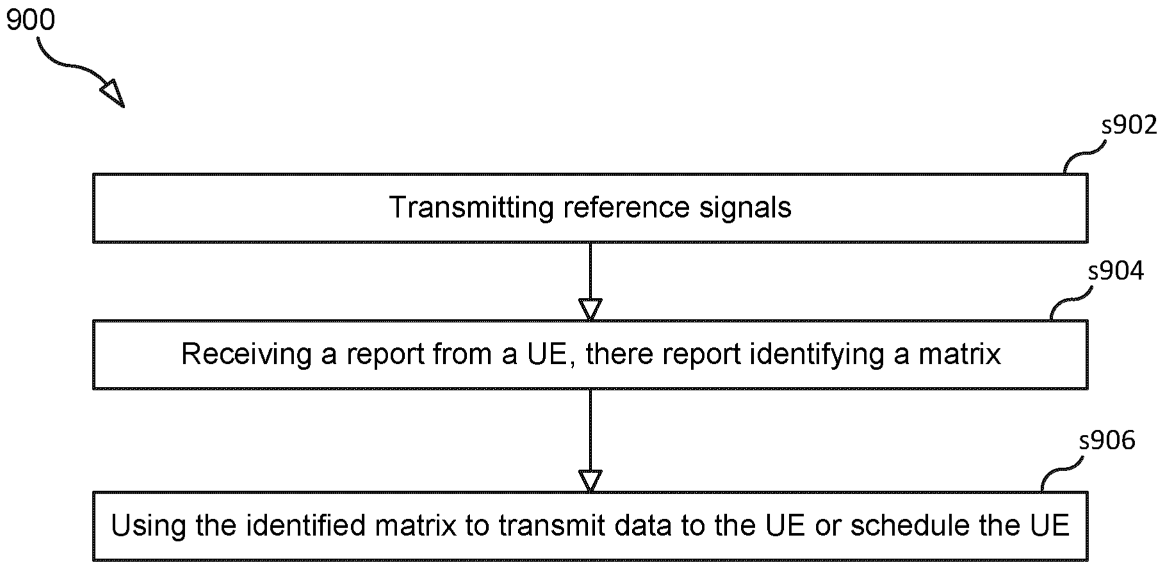
FIG. 9A is a flowchart illustrating a process according to an embodiment.

FIG. 9A is a flowchart illustrating a process 900 for reducing the number of beams required per symbol. Process 900 may be performed by gNB 304 and may begin in step s902. Step s902 comprises transmitting reference signals (RSs). Step s904 comprises receiving a report from a UE 302, the report identifying a matrix that indicates selected CSI-RS ports. Step s906 comprises using the identified matrix to transmit data to the UE or schedule the UE. The matrix identified by the UE is equal to $$W_{PS} \otimes \begin{bmatrix} 1 & 0 \\ 0 & 1 \end{bmatrix},$$

and Wps is a port selection matrix and ⊗ denotes the Kronecker product.

In some embodiments Wps is of size P/2×L, where P represents a total number of beamformed CSI-RS ports and L represents the number of selected CSI-RS ports per polarization. In some embodiment Wps consists of zeros and ones.

Figure 9B:
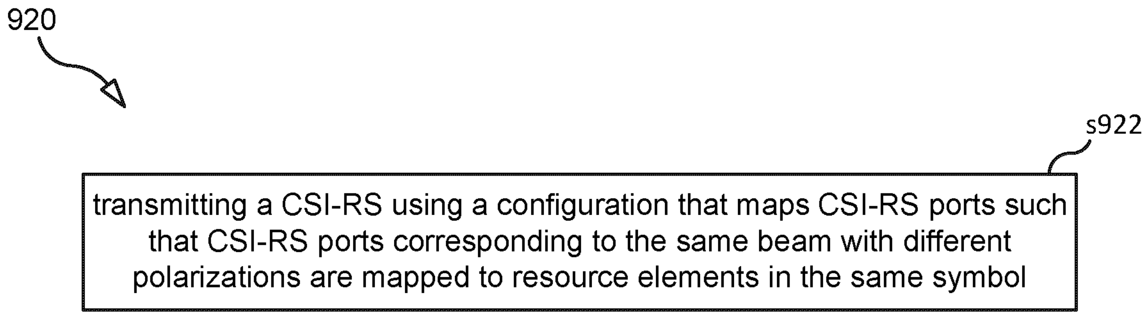
FIG. 9B is a flowchart illustrating a process according to an embodiment.

FIG. 9B is a flowchart illustrating a process 920. Process 920 may be performed by gNB 304 and may begin in step s922. Step s922 comprises transmitting a CSI-RS using a configuration that maps CSI-RS ports such that CSI-RS ports corresponding to the same beam with different polarizations are mapped to resource elements in the same symbol. In some embodiments, CSI-RS ports are numbered across CDM groups first and then within a CDM group. In some embodiments, CDM groups are numbered in order of increasing time domain allocation first and then increasing frequency domain allocation. In some embodiments, two CSI-RS ports within a symbol are beamformed in the same direction. In some embodiments, a single beamforming weight vector is applied in all CS-RS resource elements in the symbol.

Figure 10A:
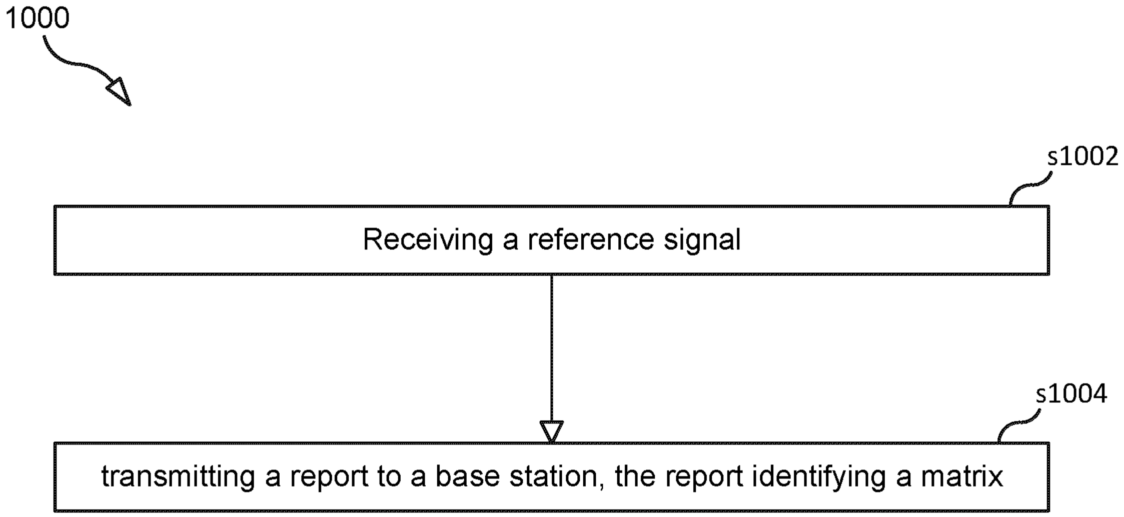
FIG. 10A is a flowchart illustrating a process according to an embodiment.

FIG. 10A is a flowchart illustrating a process 1000. Process 1000 may be performed UE 302 and may begin in step s1002. Step s1002 comprises receiving a reference signal. Step s1004 comprises transmitting a report to a base station (304), the report identifying a matrix, wherein the identified matrix is equal to $$W_{PS} \otimes \begin{bmatrix} 1 & 0 \\ 0 & 1 \end{bmatrix},$$

and Wps is a port selection matrix and ⊗ denotes the Kronecker product. In some embodiments, Wps is of size P/2×L, where P represents a total number of beamformed CSI-RS ports and L represents the number of selected CSI-RS ports per polarization. In some embodiments, Wps consists of zeros and ones.

Figure 10B:
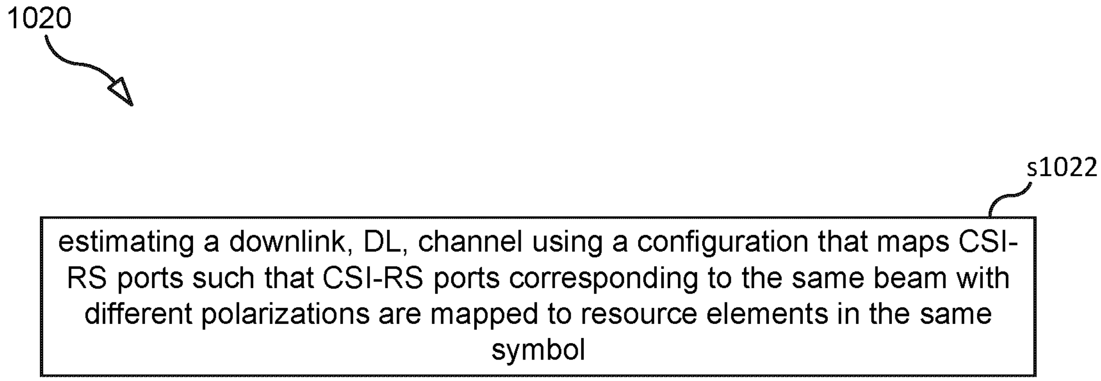
FIG. 10B is a flowchart illustrating a process according to an embodiment.

FIG. 10B is a flowchart illustrating a process 1020. Process 1020 may be performed by UE 302 and may begin in step s1022. Step s1022 comprises estimating a downlink, DL, channel using a configuration that maps CSI-RS ports such that CSI-RS ports corresponding to the same beam with different polarizations are mapped to resource elements in the same symbol. In some embodiments, CSI-RS ports are numbered across CDM groups first and then within a CDM group. In some embodiments, CDM groups are numbered in order of increasing time domain allocation first and then increasing frequency domain allocation. In some embodiments, two CSI-RS ports within a symbol are beamformed in the same direction. In some embodiments, a single beamforming weight vector is applied in all CS-RS resource elements in the symbol.

Figure 11:
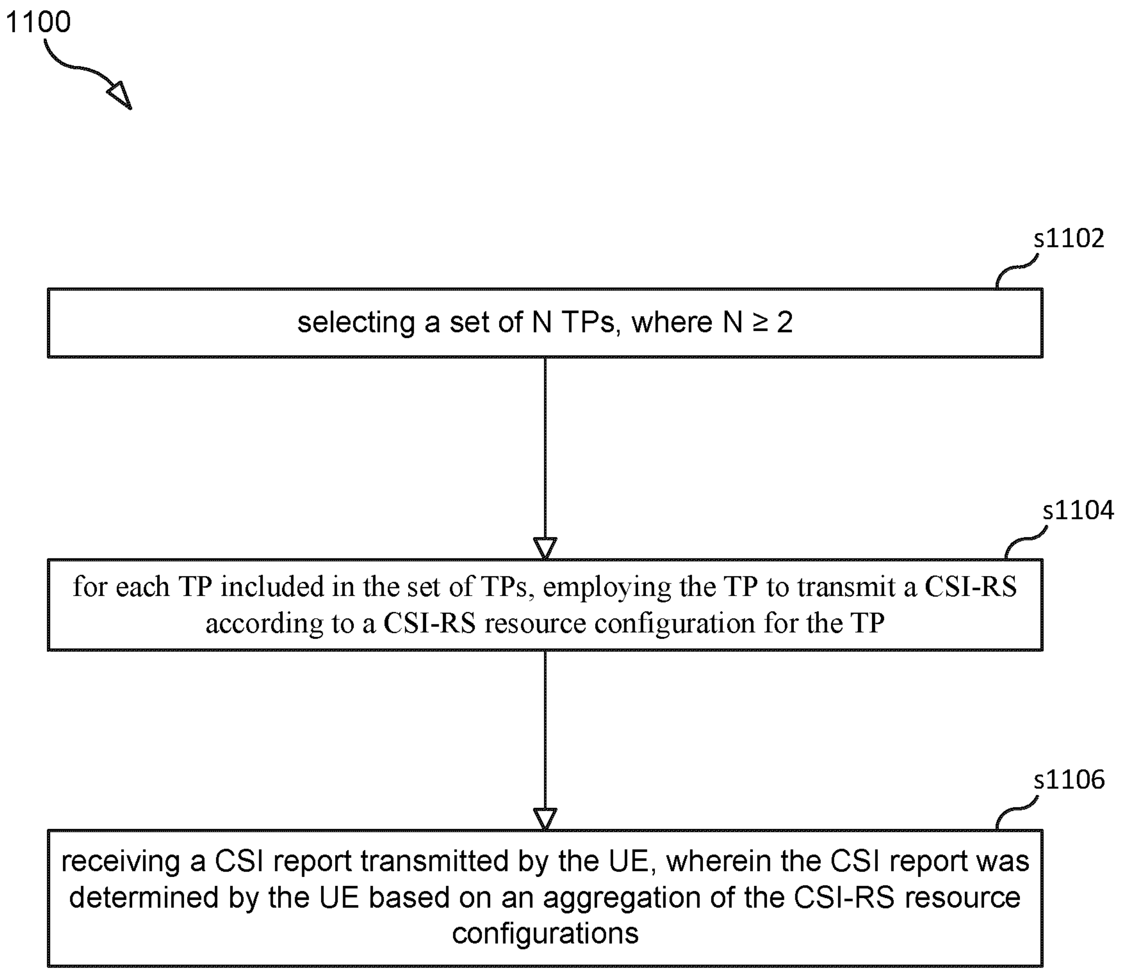
FIG. 11 is a flowchart illustrating a process according to an embodiment.

FIG. 11 is a flowchart illustrating a process 1100. Process 1100 may begin in step s1102. Step s1102 comprises, for UE 302, selecting a set of N transmission points (TPs) (e.g., base stations or antennas), where N≥2. Step s1104 comprises, for each TP included in the set of TPs, employing the TP to transmit a CSI-RS according to a CSI-RS resource configuration for the TP. Step s1106 comprises receiving a CSI report transmitted by the UE, wherein the CSI report was determined by the UE based on an aggregation of the CSI-RS resource configurations.

In some embodiments, the process also includes, for each TP included in the selected set of N TPs, configuring the UE with the CSI-RS resource configuration for the TP, thereby configuring the UE with N CSI-RS resource configurations.

In some embodiments, the process also includes, based on the CSI report, determining a precoder for a coherent joint transmission to the UE from the N TPs.

In some embodiments, the CSI report is a Type II CSI report.

In some embodiments, the CSI report comprises a precoding matrix indicator, PMI, determined by the UE based on the aggregation of the CSI-RS resource configurations.

Figure 12:
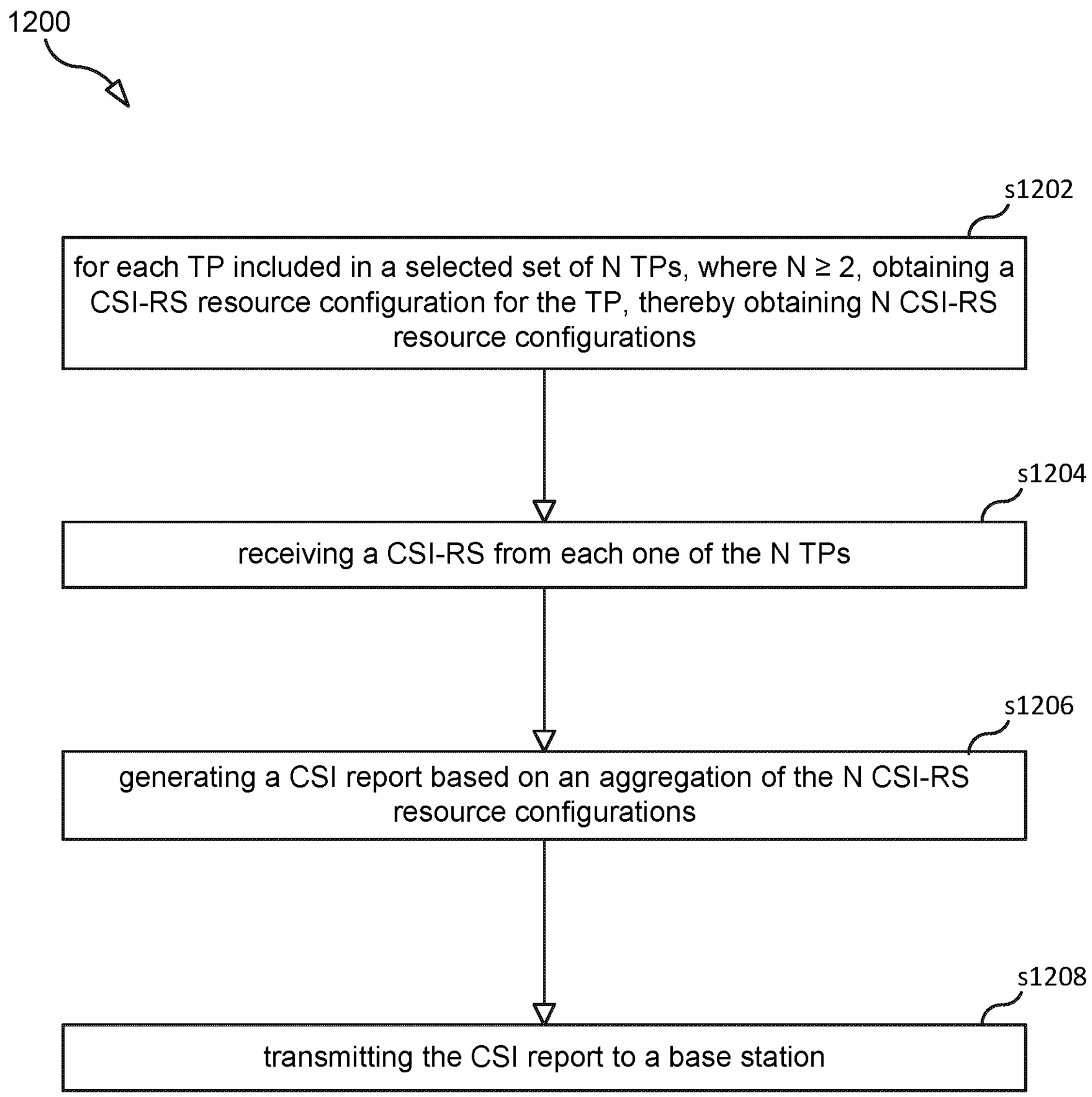
FIG. 12 is a flowchart illustrating a process according to an embodiment.

FIG. 12 is a flowchart illustrating a process 1200. Process 1200 may be performed by UE 302 and may begin in step s1202. Step s1202 comprises, for each TP included in a selected set of N TPs, where N≥2, obtaining a CSI-RS resource configuration for the TP, thereby obtaining N CSI-RS resource configurations. Step s1204 comprises receiving a CSI-RS from each one of the N TPs. Step s1206 comprises generating a CSI report based on an aggregation of the N CSI-RS resource configurations. Step s1208 comprise transmitting the CSI report to a base station (e.g., base station 304).

In some embodiments, the process also includes receiving, from each one of the N TPs, precoded data signal that was generated using a precoder determined based on the CSI report. In some embodiments, the CSI report is a Type II CSI report.

In some embodiments, receiving a CSI-RS from each one of the N TPs comprises the UE receiving a first CSI-RS from a first TP and the UE receiving a second CSI-RS from a second TP. In some embodiments, generating a CSI report based on an aggregation of the N CSI-RS resource configurations comprises: the UE generating a first channel estimate, H1, based on a measurement of the first CSI-RS; the UE generating a second channel estimate, H2, based on a measurement of the second CSI-RS; the UE aggregating H1 and H2, thereby producing an aggregated channel estimate, H; and the UE generating the CSI report based on H. In some embodiments, generating the CSI report based on H comprises the UE calculating a Type II PMI based on H and including the Type II PMI in the CSI report.

In some embodiments, N=2 and generating a CSI report based on an aggregation of the N CSI-RS resource configurations comprises: the UE obtaining (e.g., by selecting, by generating, etc.) a first precoder matrix indicator, PMI, based on a measurement of the first CSI-RS and the second CSI-RS; the UE obtaining a second PMI, based on a measurement of the first CSI-RS and the second CSI-RS; the UE aggregating the first PMI and the second PMI, thereby generating an aggregated PMI; and the UE generating the CSI report based on the aggregated PMI.

Figure 13:
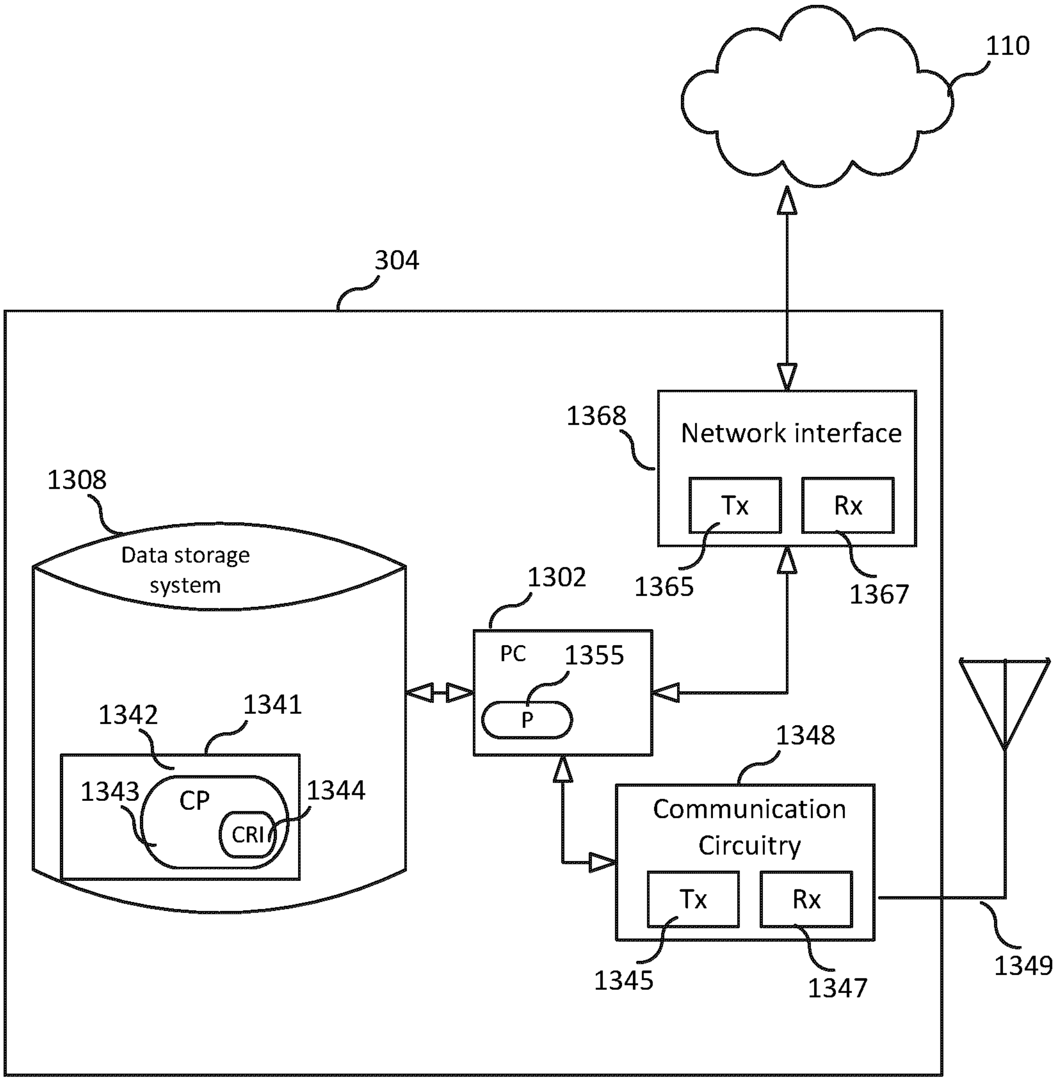
FIG. 13 is a block diagram of a base station according to an embodiment.

FIG. 13 is a block diagram of base station 304, according to some embodiments. As shown in FIG. 13, base station 304 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 304 may be a distributed computing apparatus); a network interface 1368 comprising a transmitter (Tx) 1365 and a receiver (Rx) 1367 for enabling base station 304 to transmit data to and receive data from other nodes connected to a network 110 (e.g., an Internet Protocol (IP) network) to which network interface 1368 is connected; communication circuitry 1348, which is coupled to an antenna arrangement 1349 comprising one or more antennas and which comprises a transmitter (Tx) 1345 and a receiver (Rx) 1347 for enabling base station 304 to transmit data and receive data (e.g., wirelessly transmit/receive data); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes base station 304 to perform steps described herein (e.g., steps described herein with reference to the flow charts). In other embodiments, base station 304 may be configured to perform steps described herein without the need for code. That is, for example, PC 1302 may consist merely of one or more ASICs. Hence, the features of the embodiments described herein may be implemented in hardware and/or software.

Figure 14:
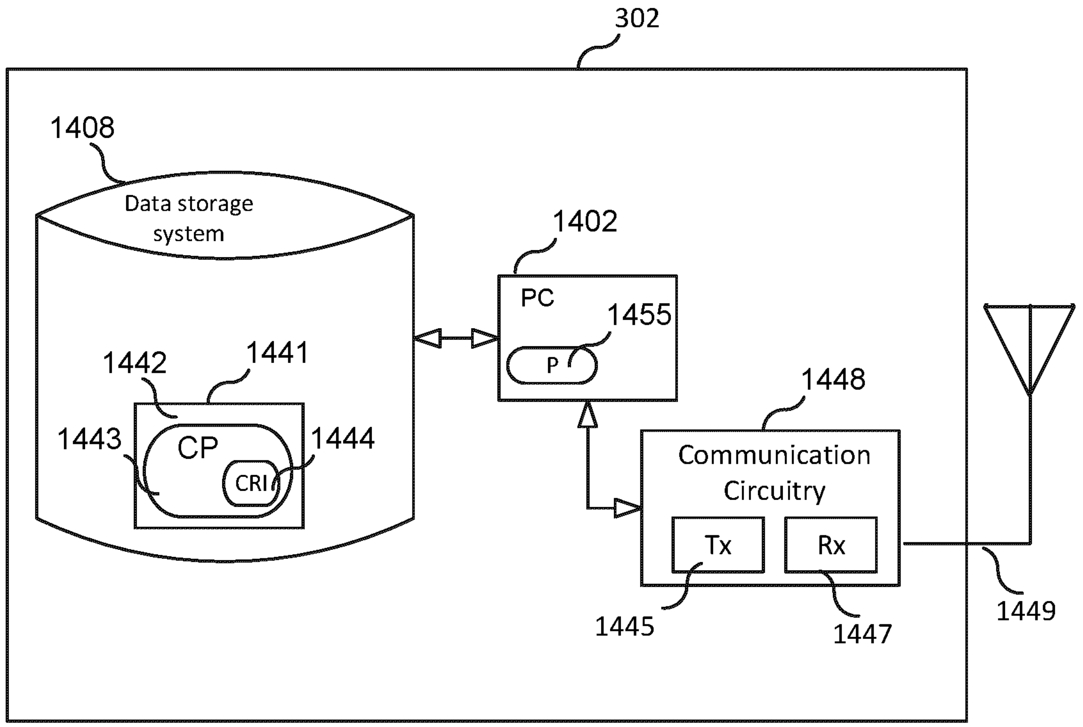
FIG. 14 is a block diagram of a base station according to an embodiment.

FIG. 14 is a block diagram of UE 302, according to some embodiments. As shown in FIG. 14, UE 302 may comprise: processing circuitry (PC) 1402, which may include one or more processors (P) 1455 (e.g., one or more general purpose microprocessors and/or one or more other processors, such as an application specific integrated circuit (ASIC), field-programmable gate arrays (FPGAs), and the like); communication circuitry 1448, which is coupled to an antenna arrangement 1449 comprising one or more antennas and which comprises a transmitter (Tx) 1445 and a receiver (Rx) 1447 for enabling UE 302 to transmit data and receive data (e.g., wirelessly transmit/receive data); and a local storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes UE 302 to perform steps described herein (e.g., steps described herein with reference to the flow charts). In other embodiments, UE 302 may be configured to perform steps described herein without the need for code. That is, for example, PC 1402 may consist merely of one or more ASICs. Hence, the features of the embodiments described herein may be implemented in hardware and/or software

Summary of Various Embodiments

A1. A method performed by a base station 304 for reducing the number of beams required per symbol, the method comprising: transmitting reference signals (RSs); receiving a report from a UE 302, the report identifying a matrix; and using the identified matrix to transmit data to the UE or schedule the UE, wherein the matrix identified by the UE is equal to $$W_{PS} \otimes \begin{bmatrix} 1 & 0 \\ 0 & 1 \end{bmatrix},$$

and Wps is a port selection matrix and ⊗ denotes the Kronecker product.

A2. The method of embodiment A1, wherein Wps is of size P/2×L, where P represents a total number of beamformed CSI-RS ports and L represents the number of selected CSI-RS ports per polarization.

A3. The method of embodiment A1 or A2, wherein Wps consists of zeros and ones.

A4. A method performed by a base station 304, the method comprising: transmitting a CSI-RS using a CSI-RS configuration that maps CSI-RS ports such that CSI-RS ports corresponding to the same beam with different polarizations are mapped to resource elements in the same symbol.

A5. The method of embodiment A4, wherein CSI-RS ports are numbered across CDM groups first and then within a CDM group.

A6. The method of embodiment A4, wherein CDM groups are numbered in order of increasing time domain allocation first and then increasing frequency domain allocation.

A7. The method of embodiment A4, A5 or A6, wherein two CSI-RS ports within a symbol are beamformed in the same direction.

A8. The method of embodiment A7, wherein a single beamforming weight vector is applied in all CSI-RS resource elements in the symbol.

A9. The method of any one of embodiments A4-A8, further comprising receiving a message transmitted by a user equipment, UE, wherein the message comprises UE capability information indicating that the UE supports the CSI-RS configuration. A10. The method of any one of embodiments A4-A9, further comprising configuring a user equipment, UE, to use the CSI-RS configuration for a channel measurement.

A11. The method of any one of embodiments A4-A10, wherein said CSI-RS configuration configures a code division multiplexing group (CDM) across subcarriers only, not across time.

A12. The method of any one of embodiment A4-A11, wherein the CSI-RS ports are conveyed over multiple CSI-RS resources, each CSI-RS resource containing a subset of the CSI-RS ports.

A13. The method of any one of claims A4-A12, wherein the CSI-RS configuration has X ports and the method further comprises obtaining the CSI-RS resource configuration by aggregating multiple instances of CSI-RS resource configurations of less than X ports.

A14. A method comprising: for a user equipment, UE, selecting a set of N transmission points, TPs, where N≥2; for each TP included in the set of TPs, employing the TP to transmit a channel state information reference signal (CSI-RS) according to a CSI-RS resource configuration for the TP; and receiving a channel state information (CSI) report transmitted by the UE, wherein the CSI report was determined by the UE based on an aggregation of the CSI-RS resource configurations.

A15. The method of claim A14, further comprising: for each TP included in the selected set of N TPs, configuring the UE with the CSI-RS resource configuration for the TP, thereby configuring the UE with N CSI-RS resource configurations.

A16. The method of claim A14 or A15, further comprising, based on the CSI report, determining a precoder for a coherent joint transmission to the UE from the N TPs.

A17. The method of any one of claims A14-A16, wherein the CSI report is a Type II CSI report.

A18. The method of any one of claims A1-A17, wherein the CSI report comprises a precoding matrix indicator, PMI, determined by the UE based on the aggregation of the CSI-RS resource configurations.

B1. A method performed by a UE 302, the method comprising: receiving a reference signal; and transmitting a report to a base station 304, the report identifying a matrix, wherein the identified matrix is equal to $$W_{PS} \otimes \begin{bmatrix} 1 & 0 \\ 0 & 1 \end{bmatrix},$$

and Wps is a port selection matrix and ⊗ denotes the Kronecker product.

B2. The method of embodiment B1, wherein Wps is of size P/2×L, where P represents a total number of beamformed CSI-RS ports and L represents the number of selected CSI-RS ports per polarization.

B3. The method of embodiment B1 or B2, wherein Wps consists of zeros and ones.

B4. A method performed by a UE 302, the method comprising: estimating a downlink, DL, channel using a CSI-RS configuration that maps CSI-RS ports such that CSI-RS ports corresponding to the same beam with different polarizations are mapped to resource elements in the same symbol.

B5. The method of embodiment B4, wherein CSI-RS ports are numbered across CDM groups first and then within a CDM group.

B6. The method of embodiment B4, wherein CDM groups are numbered in order of increasing time domain allocation first and then increasing frequency domain allocation.

B7. The method of embodiment B4, B5 or B6, wherein two CSI-RS ports within a symbol are beamformed in the same direction.

B8. The method of embodiment B7, wherein a single beamforming weight vector is applied in all CS-RS resource elements in the symbol.

B9. The method of any one of embodiments B4-B8, further comprising transmitting a message to a serving base station, wherein the message comprises UE capability information indicating that the UE supports the CSI-RS configuration.

B10. The method of any one of embodiments B4-B9, further comprising using the CSI-RS configuration for a channel measurement.

B11. The method of any one of embodiments B4-B10, wherein said CSI-RS configuration configures a code division multiplexing group (CDM) across subcarriers only, not across time.

B12. The method of any one of embodiment B4-B11, wherein the CSI-RS ports are conveyed over multiple CSI-RS resources, each CSI-RS resource containing a subset of the CSI-RS ports.

B13. The method of any one of claims B4-B12, wherein the CSI-RS configuration has X ports and the CSI-RS resource configuration was obtained by aggregating multiple instances of CSI-RS resource configurations of less than X ports.

B14. A method performed by a UE, the method comprising: for each transmission point, TP, included in a selected set of N TPs, where N≥2, obtaining a channel state information reference signal (CSI-RS) resource configuration for the TP, thereby obtaining N CSI-RS resource configurations; receiving a CSI-RS from each one of the N TPs; generating a CSI report based on an aggregation of the N CSI-RS resource configurations; and transmitting the CSI report to a base station.

B15. The method of claim B14, further comprising receiving, from each one of the N TPs, precoded data signal that was generated using a precoder determined based on the CSI report.

B16. The method of claim B14 or B15, wherein the CSI report is a Type II CSI report.

B17. The method of any one of claims B14-B16, wherein receiving a CSI-RS from each one of the N TPs comprises the UE receiving a first CSI-RS from a first TP and the UE receiving a second CSI-RS from a second TP.

B18. The method of claim B17, wherein generating a CSI report based on an aggregation of the N CSI-RS resource configurations comprises: the UE generating a first channel estimate, H1, based on a measurement of the first CSI-RS; the UE generating a second channel estimate, H2, based on a measurement of the second CSI-RS; the UE aggregating H1 and H2, thereby producing an aggregated channel estimate, H; and the UE generating the CSI report based on H.

B19. The method of claim B18, wherein generating the CSI report based on H comprises the UE calculating a Type II PMI based on H and including the Type II PMI in the CSI report.

B20. The method of claim B17, wherein N=2 and generating a CSI report based on an aggregation of the N CSI-RS resource configurations comprises: the UE obtaining a first precoder matrix indicator, PMI, based on a measurement of the first CSI-RS and the second CSI-RS; the UE obtaining a second PMI, based on a measurement of the first CSI-RS and the second CSI-RS; the UE aggregating the first PMI and the second PMI, thereby generating an aggregated PMI; and the UE generating the CSI report based on the aggregated PMI.

C1a. A computer program 1343 comprising instructions 1344 which when executed by processing circuitry 1302 of a base station 304, causes the base station 304 to perform the method of any one of embodiments A1-A18.

C1b. A computer program 1443 comprising instructions 1444 which when executed by processing circuitry 1402 of a UE 320, causes the UE 302 to perform the method of any one of embodiments B1-B20.

C2. A carrier containing the computer program of embodiment C1a or C1b, wherein the carrier is one of an electronic signal, an optical signal, a radio signal, and a computer readable storage medium 1342, 1442.

D1. A base station 304, the base station 304 being adapted to perform the method of any one embodiments A1-A18.

D2. A base station 304, the base station 304 comprising: processing circuitry 1302; and a memory 1342, the memory containing instructions 1344 executable by the processing circuitry, whereby the base station 304 is operative to perform the method of any one the embodiments A1-A18.

E1. A UE 302, the UE 302 being adapted to perform the method of any one embodiments B1-B20.

E2. A UE 302, the UE 302 comprising: processing circuitry 1402; and a memory 1442, the memory containing instructions 1444 executable by the processing circuitry, whereby the UE 302 is operative to perform the method of any one the embodiments B1 -B20.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:

for each transmission point (TP) included in a selected set of N TPs, where N≥2 such that the set of N TPs includes at least a first TP and a second TP, obtaining a channel state information reference signal (CSI-RS) resource configuration for the TP, wherein the obtaining comprises:

obtaining a first CSI-RS resource configuration for the first TP indicating resources that the first TP is configured to use to transmit a first CSI-RS; and obtaining a second CSI-RS resource configuration for the second TP indicating resources that the second TP is configured to use to transmit a second CSI-RS;

receiving a CSI-RS from each one of the N TPs, wherein receiving a CSI-RS from each one of the N TPs comprises:

receiving the first CSI-RS transmitted by the first TP; and receiving the second CSI-RS transmitted by the second TP;

generating a CSI report based on an aggregation of the N CSI-RS resource configurations; and transmitting the CSI report to a base station, wherein generating a CSI report based on an aggregation of the N CSI-RS resource configurations comprises:

the UE generating a first channel estimate, H1, based on a measurement of the first CSI-RS;

the UE generating a second channel estimate, H2, based on a measurement of the second CSI-RS;

the UE using H1 and H2 to produce an aggregated channel estimate; and the UE generating the CSI report based on the aggregated channel estimate (H).

2. The method of claim 1, further comprising receiving, from each one of the N TPs, precoded data signal that was generated using a precoder determined based on the CSI report.

3. The method of claim 1, wherein generating the CSI report based on the aggregated channel estimate comprises the UE calculating a Type II PMI based on the aggregated channel estimate and including the Type II PMI in the CSI report.

4. A method performed by a user equipment (UE), the method comprising:

for each transmission point (TP) included in a selected set of N TPs, where N≥2 such that the set of N TPs includes at least a first TP and a second TP, obtaining a channel state information reference signal (CSI-RS) resource configuration for the TP, wherein the obtaining comprises:

obtaining a first CSI-RS resource configuration for the first TP indicating resources that the first TP is configured to use to transmit a first CSI-RS; and obtaining a second CSI-RS resource configuration for the second TP indicating resources that the second TP is configured to use to transmit a second CSI-RS;

receiving a CSI-RS from each one of the N TPs, wherein receiving a CSI-RS from each one of the N TPs comprises:

receiving the first CSI-RS transmitted by the first TP; and receiving the second CSI-RS transmitted by the second TP;

generating a CSI report based on an aggregation of the N CSI-RS resource configurations; and transmitting the CSI report to a base station, wherein N=2, and generating a CSI report based on an aggregation of the N CSI-RS resource configurations comprises:

the UE obtaining a first precoder matrix indicator (PMI) based on a measurement of the first CSI-RS and the second CSI-RS;

the UE obtaining a second PMI, based on a measurement of the first CSI-RS and the second CSI-RS;

the UE aggregating the first PMI and the second PMI, thereby generating an aggregated PMI; and the UE generating the CSI report based on the aggregated PMI.

5. A user equipment (UE), the UE being adapted to perform a method comprising:

for each transmission point (TP) included in a selected set of N TPs, where N≥2 such that the set of N TPs includes at least a first TP and a second TP, obtaining a channel state information reference signal (CSI-RS) resource configuration for the TP, thereby obtaining N CSI-RS resource configurations, wherein the N CSI-RS resource configurations comprise:

a first CSI-RS resource configuration for the first TP indicating resources that the first TP is configured to use to transmit a first CSI-RS; and a second CSI-RS resource configuration for the second TP indicating resources that the second TP is configured to use to transmit a second CSI-RS;

receiving a CSI-RS from each one of the N TPs, wherein receiving a CSI-RS from each one of the N TPs comprises:

receiving the first CSR-RS transmitted by the first TP; and receiving the second CSR-RS transmitted by the second TP;

generating a CSI report based on an aggregation of the N CSI-RS resource configurations; and transmitting the CSI report to a base station, wherein N=2, and generating a CSI report based on an aggregation of the N CSI-RS resource configurations comprises:

the UE obtaining a first precoder matrix indicator, PMI, based on a measurement of the first CSI-RS and the second CSI-RS;

the UE obtaining a second PMI, based on a measurement of the first CSI-RS and the second CSI-RS;

the UE aggregating the first PMI and the second PMI, thereby generating an aggregated PMI; and the UE generating the CSI report based on the aggregated PMI.

6. The UE of claim 5, wherein the method further comprises receiving, from each one of the N TPs, precoded data signal that was generated using a precoder determined based on the CSI report.

7. A user equipment (UE), the UE being adapted to perform a method comprising:

for each transmission point (TP) included in a selected set of N TPs, where N≥2 such that the set of N TPs includes at least a first TP and a second TP, obtaining a channel state information reference signal (CSI-RS) resource configuration for the TP, thereby obtaining N CSI-RS resource configurations, wherein the N CSI-RS resource configurations comprise:

a first CSI-RS resource configuration for the first TP indicating resources that the first TP is configured to use to transmit a first CSI-RS; and a second CSI-RS resource configuration for the second TP indicating resources that the second TP is configured to use to transmit a second CSI-RS;

receiving a CSI-RS from each one of the N TPs, wherein receiving a CSI-RS from each one of the N TPs comprises:

receiving the first CSR-RS transmitted by the first TP; and receiving the second CSR-RS transmitted by the second TP;

generating a CSI report based on an aggregation of the N CSI-RS resource configurations; and transmitting the CSI report to a base station, wherein generating the CSI report based on an aggregation of the N CSI-RS resource configurations comprises:

the UE generating a first channel estimate, H1, based on a measurement of the first CSI-RS;

the UE generating a second channel estimate, H2, based on a measurement of the second CSI-RS;

the UE using H1 and H2 to produce an aggregated channel estimate; and the UE generating the CSI report based on the aggregated channel estimate (H).

8. The UE of claim 7, wherein generating the CSI report based on the aggregated channel estimate comprises the UE calculating a Type II PMI based on the aggregated channel estimate and including the Type II PMI in the CSI report.

* * * * *